US010191515B2

(12) United States Patent
Westerinen et al.

(10) Patent No.: US 10,191,515 B2
(45) Date of Patent: *Jan. 29, 2019

(54) MOBILE DEVICE LIGHT GUIDE DISPLAY

(75) Inventors: William J. Westerinen, Issaquah, WA (US); Steven John Robbins, Bellevue, WA (US); Rajeev Badyal, Sammamish, WA (US); Rod G. Fleck, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 225 days.

This patent is subject to a terminal disclaimer.

(21) Appl. No.: 13/432,311

(22) Filed: Mar. 28, 2012

(65) Prior Publication Data
US 2013/0258701 A1 Oct. 3, 2013

(51) Int. Cl.
G06F 1/16 (2006.01)
G06F 3/01 (2006.01)
G06F 3/147 (2006.01)

(52) U.S. Cl.
CPC .......... *G06F 1/1637* (2013.01); *G06F 1/1643* (2013.01); *G06F 3/013* (2013.01); *G06F 3/147* (2013.01); *G06F 2200/1637* (2013.01); *G06F 2203/04804* (2013.01); *G09G 2320/0261* (2013.01)

(58) Field of Classification Search
None
See application file for complete search history.

(56) References Cited

U.S. PATENT DOCUMENTS

| 2,012,011 | A | 8/1935 | Keller |
| 3,410,774 | A | 11/1968 | Fred et al. |
| 3,836,258 | A | 9/1974 | Courten et al. |
| 3,906,528 | A | 9/1975 | Johnson |
| 3,971,065 | A | 7/1976 | Bayer |
| 4,711,512 | A | 12/1987 | Upatnieks |
| 4,822,145 | A | 4/1989 | Staelin |
| 4,860,361 | A | 8/1989 | Sato et al. |
| 4,957,351 | A | 9/1990 | Shioji |
| 5,019,808 | A | 5/1991 | Prince et al. |

(Continued)

FOREIGN PATENT DOCUMENTS

| AU | 2011204946 | 12/2011 |
| CN | 1373385 A | 10/2002 |

(Continued)

OTHER PUBLICATIONS

"OptiGrate", Aug 14, 2009; Retrieved from Internet: URL: http://web.archive.org/web/20090814104232/http://www.optigrate.com/BragGrate_Mirror.html.*

(Continued)

*Primary Examiner* — Nurun N Flora
(74) *Attorney, Agent, or Firm* — Ray Quinney & Nebeker P.C.; John O. Carpenter

(57) ABSTRACT

Light guide techniques are described. In one or more implementations, an apparatus includes a housing, a light guide supported by the housing, a light engine disposed within the housing and optically coupled to the light guide, and one or more modules disposed within the housing and implemented at least partially in hardware. The one or more modules are configured to cause the light engine to output a user interface for display using the light guide along an image plane focused at infinity.

20 Claims, 10 Drawing Sheets

(56) References Cited

U.S. PATENT DOCUMENTS

| | | |
|---|---|---|
| 5,146,355 A | 9/1992 | Prince et al. |
| 5,252,950 A | 10/1993 | Saunders et al. |
| 5,309,169 A | 5/1994 | Leppert |
| 5,359,444 A | 10/1994 | Piosenka et al. |
| 5,453,877 A | 9/1995 | Gerbe et al. |
| 5,455,458 A | 10/1995 | Quon et al. |
| 5,455,601 A | 10/1995 | Ozaki |
| 5,455,882 A | 10/1995 | Veligdan |
| 5,459,611 A | 10/1995 | Bohn et al. |
| 5,483,307 A | 1/1996 | Anderson |
| 5,491,580 A | 2/1996 | O'Meara |
| 5,543,588 A | 8/1996 | Bisset et al. |
| 5,574,473 A | 11/1996 | Sekiguchi |
| 5,579,830 A | 12/1996 | Giammaruti |
| 5,583,609 A | 12/1996 | Mizutani et al. |
| 5,606,455 A | 2/1997 | Eichenlaub |
| 5,614,941 A | 3/1997 | Hines |
| 5,648,643 A | 7/1997 | Knowles et al. |
| 5,651,414 A | 7/1997 | Suzuki et al. |
| 5,673,146 A | 9/1997 | Kelly |
| 5,708,449 A | 1/1998 | Heacock et al. |
| 5,714,967 A | 2/1998 | Okamura et al. |
| 5,737,171 A | 4/1998 | Buller et al. |
| 5,751,476 A | 5/1998 | Matsui et al. |
| 5,771,320 A | 6/1998 | Stone |
| 5,777,715 A | 7/1998 | Kruegle et al. |
| 5,856,842 A | 1/1999 | Tedesco |
| 5,861,931 A | 1/1999 | Gillian et al. |
| 5,886,822 A | 3/1999 | Spitzer |
| 5,940,149 A | 8/1999 | Vanderwerf |
| 5,959,664 A | 9/1999 | Woodgate |
| 5,982,553 A | 11/1999 | Bloom et al. |
| 5,991,087 A | 11/1999 | Rallison |
| 6,101,008 A | 8/2000 | Popovich |
| 6,144,439 A | 11/2000 | Carollo |
| 6,160,667 A | 12/2000 | Smoot |
| 6,188,427 B1 | 2/2001 | Anderson et al. |
| 6,226,178 B1 | 5/2001 | Broder et al. |
| 6,239,502 B1 | 5/2001 | Grewe et al. |
| 6,264,787 B1 | 7/2001 | Burbank |
| 6,271,808 B1 | 8/2001 | Corbin |
| 6,307,142 B1 | 10/2001 | Allen et al. |
| 6,323,970 B1 | 11/2001 | Popovich |
| 6,377,401 B1 | 4/2002 | Bartlett |
| 6,411,512 B1 | 6/2002 | Mankaruse et al. |
| 6,446,442 B1 | 9/2002 | Batchelor et al. |
| 6,466,198 B1 | 10/2002 | Feinstein |
| 6,470,289 B1 | 10/2002 | Peters et al. |
| 6,481,851 B1 | 11/2002 | McNelley et al. |
| 6,496,218 B2 | 12/2002 | Takigawa et al. |
| 6,529,331 B2 | 3/2003 | Massof et al. |
| 6,542,307 B2 | 4/2003 | Gleckman et al. |
| 6,545,650 B1 | 4/2003 | Yamada et al. |
| 6,547,416 B2 | 4/2003 | Pashley et al. |
| 6,554,428 B2 | 4/2003 | Fergason et al. |
| 6,567,101 B1 | 5/2003 | Thomas |
| 6,577,411 B1 | 6/2003 | David |
| 6,580,529 B1 | 6/2003 | Amitai et al. |
| 6,606,152 B2 | 8/2003 | Littau |
| 6,621,702 B2 | 9/2003 | Elias et al. |
| 6,631,755 B1 | 10/2003 | Kung et al. |
| 6,635,999 B2 | 10/2003 | Belliveau |
| 6,639,201 B2 | 10/2003 | Almogy et al. |
| 6,735,499 B2 | 5/2004 | Ohki et al. |
| 6,753,828 B2 | 6/2004 | Tuceryan et al. |
| 6,775,460 B2 | 8/2004 | Steiner et al. |
| 6,804,115 B2 | 10/2004 | Lai |
| 6,809,925 B2 | 10/2004 | Belady et al. |
| 6,825,987 B2 | 11/2004 | Repetto et al. |
| 6,829,095 B2 | 12/2004 | Amitai |
| 6,867,753 B2 | 3/2005 | Chinthammit et al. |
| 6,888,613 B2 | 5/2005 | Robins et al. |
| 6,889,755 B2 | 5/2005 | Zuo et al. |
| 6,906,901 B1 | 6/2005 | Liu |
| 6,919,867 B2 | 7/2005 | Sauer |
| 6,947,020 B2 | 9/2005 | Kiser et al. |
| 6,964,731 B1 | 11/2005 | Krisko et al. |
| 6,971,443 B2 | 12/2005 | Kung et al. |
| 6,992,738 B2 | 1/2006 | Ishihara et al. |
| 6,997,241 B2 | 2/2006 | Chou et al. |
| 7,006,215 B2 | 2/2006 | Hoff et al. |
| 7,015,876 B1 | 3/2006 | Miller |
| 7,048,385 B2 | 5/2006 | Beeson et al. |
| 7,069,975 B1 | 7/2006 | Haws et al. |
| 7,113,605 B2 | 9/2006 | Rui et al. |
| 7,116,555 B2 | 10/2006 | Kamath et al. |
| 7,184,615 B2 | 2/2007 | Levola |
| 7,191,820 B2 | 3/2007 | Chou et al. |
| 7,193,584 B2 | 3/2007 | Lee et al. |
| 7,250,930 B2 | 7/2007 | Hoffman et al. |
| 7,261,453 B2 | 8/2007 | Morejon et al. |
| 7,271,795 B2 | 9/2007 | Bradski |
| 7,277,282 B2 | 10/2007 | Tate |
| 7,301,587 B2 | 11/2007 | Uehara et al. |
| 7,337,018 B2 | 2/2008 | Espinoza-Ibarra et al. |
| 7,359,420 B2 | 4/2008 | Shchegrov et al. |
| 7,365,734 B2 | 4/2008 | Fateh et al. |
| 7,369,101 B2 | 5/2008 | Sauer et al. |
| 7,376,852 B2 | 5/2008 | Edwards |
| 7,396,133 B2 | 7/2008 | Burnett et al. |
| 7,412,306 B2 | 8/2008 | Katoh et al. |
| 7,416,017 B2 | 8/2008 | Haws et al. |
| 7,417,617 B2 | 8/2008 | Eichenlaub |
| 7,418,170 B2 | 8/2008 | Mukawa et al. |
| 7,428,001 B2 | 9/2008 | Schowengerdt et al. |
| 7,430,349 B2 | 9/2008 | Jones |
| 7,430,355 B2 | 9/2008 | Heikenfeld et al. |
| 7,455,102 B2 | 11/2008 | Cheng |
| 7,505,269 B1 | 3/2009 | Cosley et al. |
| 7,513,627 B2 | 4/2009 | Larson et al. |
| 7,515,143 B2 | 4/2009 | Keam et al. |
| 7,542,665 B2 | 6/2009 | Lei |
| 7,551,814 B1 | 6/2009 | Smits |
| 7,576,916 B2 | 8/2009 | Amitai |
| 7,583,327 B2 | 9/2009 | Takatani |
| 7,607,111 B2 | 10/2009 | Vaananen et al. |
| 7,619,895 B1 | 11/2009 | Wertz et al. |
| 7,631,687 B2 | 12/2009 | Yang |
| 7,646,606 B2 | 1/2010 | Rytka et al. |
| 7,649,594 B2 | 1/2010 | Kim et al. |
| 7,660,500 B2 | 2/2010 | Konttinen et al. |
| 7,679,641 B2 | 3/2010 | Lipton et al. |
| 7,693,292 B1 | 4/2010 | Gross et al. |
| 7,701,716 B2 | 4/2010 | Blanco, Jr. et al. |
| 7,719,769 B2 | 5/2010 | Sugihara et al. |
| 7,768,534 B2 | 8/2010 | Pentenrieder et al. |
| 7,777,944 B2 | 8/2010 | Ho et al. |
| 7,817,104 B2 | 10/2010 | Ryu et al. |
| 7,832,885 B2 | 11/2010 | Hsiao et al. |
| 7,843,691 B2 | 11/2010 | Reichert et al. |
| 7,868,300 B2 | 1/2011 | Kruit et al. |
| 7,894,613 B1 | 2/2011 | Ong et al. |
| 7,903,409 B2 | 3/2011 | Patel et al. |
| 7,909,958 B2 | 3/2011 | Washburn et al. |
| 7,941,231 B1 | 5/2011 | Dunn |
| 7,986,462 B2 | 7/2011 | Kobayashi et al. |
| 8,004,621 B2 | 8/2011 | Woodgate et al. |
| 8,033,709 B2 | 10/2011 | Kao et al. |
| 8,046,616 B2 | 10/2011 | Edwards |
| 8,061,411 B2 | 11/2011 | Xu et al. |
| 8,085,948 B2 | 12/2011 | Thomas et al. |
| 8,092,064 B2 | 1/2012 | Erchak et al. |
| 8,125,579 B2 | 2/2012 | Khan et al. |
| 8,160,411 B2 | 4/2012 | Levola et al. |
| 8,195,220 B2 | 6/2012 | Kim et al. |
| 8,233,204 B1 | 7/2012 | Robbins et al. |
| 8,233,273 B2 | 7/2012 | Chen et al. |
| 8,246,170 B2 | 8/2012 | Yamamoto et al. |
| 8,274,614 B2 | 9/2012 | Yokote et al. |
| 8,384,999 B1 | 2/2013 | Crosby et al. |
| 8,392,035 B2 | 3/2013 | Patel et al. |
| 8,395,898 B1 | 3/2013 | Chamseddine et al. |
| 8,418,083 B1 | 4/2013 | Lundy et al. |
| 8,446,340 B2 | 5/2013 | Aharoni |

(56) References Cited

U.S. PATENT DOCUMENTS

| | | |
|---|---|---|
| 8,472,119 B1 | 6/2013 | Kelly |
| 8,482,920 B2 | 7/2013 | Tissot et al. |
| 8,576,143 B1 | 11/2013 | Kelly |
| 8,611,014 B2 | 12/2013 | Valera et al. |
| 8,629,815 B2 | 1/2014 | Brin et al. |
| 8,638,498 B2 | 1/2014 | Bohn et al. |
| 8,645,871 B2 | 2/2014 | Fong et al. |
| 8,666,212 B1 | 3/2014 | Amirparviz |
| 8,712,598 B2 | 4/2014 | Dighde et al. |
| 8,754,831 B2 | 6/2014 | Kollin et al. |
| 8,770,813 B2 | 7/2014 | Bohn et al. |
| 8,810,600 B2 | 8/2014 | Bohn et al. |
| 8,817,350 B1 | 8/2014 | Robbins et al. |
| 8,823,531 B1 | 9/2014 | McCleary et al. |
| 8,854,802 B2 | 10/2014 | Robinson et al. |
| 8,909,384 B1 | 12/2014 | Beitelmal et al. |
| 8,917,453 B2 | 12/2014 | Bohn |
| 8,934,235 B2 | 1/2015 | Rubenstein et al. |
| 8,941,683 B2 | 1/2015 | Son et al. |
| 8,989,535 B2 | 3/2015 | Robbins |
| 9,052,414 B2 | 6/2015 | Travis et al. |
| 9,223,138 B2 | 12/2015 | Bohn |
| 9,272,338 B2 | 3/2016 | Fujita et al. |
| 9,297,996 B2 | 3/2016 | Bohn et al. |
| 9,298,012 B2 | 3/2016 | Bohn et al. |
| 9,368,546 B2 | 6/2016 | Fleck et al. |
| 9,558,590 B2 * | 1/2017 | Westerinen ............. G06F 3/147 |
| 9,578,318 B2 | 2/2017 | Fleck et al. |
| 9,581,820 B2 | 2/2017 | Robbins |
| 9,684,174 B2 | 6/2017 | Fleck et al. |
| 9,717,981 B2 | 8/2017 | Robbins et al. |
| 9,726,887 B2 | 8/2017 | Fleck et al. |
| 9,779,643 B2 | 10/2017 | Bohn et al. |
| 9,807,381 B2 | 10/2017 | Fleck et al. |
| 2001/0043208 A1 | 11/2001 | Furness, III et al. |
| 2002/0015110 A1 | 2/2002 | Brown |
| 2002/0041735 A1 | 4/2002 | Cai et al. |
| 2002/0044152 A1 | 4/2002 | Abbott et al. |
| 2002/0044162 A1 | 4/2002 | Sawatari |
| 2002/0063820 A1 | 5/2002 | Broer et al. |
| 2002/0097558 A1 | 7/2002 | Stone et al. |
| 2002/0171939 A1 | 11/2002 | Song |
| 2002/0180659 A1 | 12/2002 | Takahashi |
| 2003/0006364 A1 | 1/2003 | Katzir et al. |
| 2003/0023889 A1 | 1/2003 | Hofstee et al. |
| 2003/0137706 A1 | 7/2003 | Rmanujam et al. |
| 2003/0179453 A1 | 9/2003 | Mori et al. |
| 2004/0011503 A1 | 1/2004 | Kung et al. |
| 2004/0012341 A1 | 1/2004 | Hyuga |
| 2004/0085649 A1 | 5/2004 | Repetto et al. |
| 2004/0108971 A1 | 6/2004 | Waldern et al. |
| 2004/0109234 A1 | 6/2004 | Levola |
| 2004/0135209 A1 | 7/2004 | Hsieh et al. |
| 2004/0195963 A1 | 10/2004 | Choi et al. |
| 2004/0267990 A1 | 12/2004 | Lin |
| 2005/0174737 A1 | 8/2005 | Meir |
| 2005/0179372 A1 | 8/2005 | Kawakami et al. |
| 2005/0207120 A1 | 9/2005 | Tseng et al. |
| 2005/0225233 A1 | 10/2005 | Boroson et al. |
| 2005/0243107 A1 | 11/2005 | Haim et al. |
| 2005/0248705 A1 | 11/2005 | Smith et al. |
| 2005/0285878 A1 | 12/2005 | Singh et al. |
| 2005/0285879 A1 | 12/2005 | Suzuki et al. |
| 2005/0286125 A1 | 12/2005 | Sundstrom |
| 2006/0018025 A1 | 1/2006 | Sharon et al. |
| 2006/0032616 A1 | 2/2006 | Yang |
| 2006/0038881 A1 | 2/2006 | Starkweather et al. |
| 2006/0044399 A1 | 3/2006 | Fredlund et al. |
| 2006/0054787 A1 | 3/2006 | Olsen et al. |
| 2006/0072206 A1 | 4/2006 | Tsuyuki et al. |
| 2006/0118280 A1 | 6/2006 | Liu |
| 2006/0129951 A1 * | 6/2006 | Vaananen ............. G06F 1/1626 715/864 |
| 2006/0132914 A1 | 6/2006 | Weiss et al. |
| 2006/0139447 A1 | 6/2006 | Unkrich |
| 2006/0152646 A1 | 7/2006 | Schrader |
| 2006/0164382 A1 | 7/2006 | Kulas et al. |
| 2006/0196643 A1 | 9/2006 | Hata et al. |
| 2006/0215244 A1 | 9/2006 | Yosha et al. |
| 2006/0221448 A1 | 10/2006 | Nivon et al. |
| 2006/0228073 A1 | 10/2006 | Mukawa et al. |
| 2006/0249765 A1 | 11/2006 | Hsieh |
| 2007/0002412 A1 | 1/2007 | Aihara |
| 2007/0008456 A1 | 1/2007 | Lesage et al. |
| 2007/0023703 A1 | 2/2007 | Sunaoshi et al. |
| 2007/0027591 A1 | 2/2007 | Goldenberg et al. |
| 2007/0041684 A1 | 2/2007 | Popovich et al. |
| 2007/0097019 A1 | 5/2007 | Wynne-Powell et al. |
| 2007/0147673 A1 | 6/2007 | Crandall |
| 2007/0153395 A1 | 7/2007 | Repetto et al. |
| 2007/0164988 A1 | 7/2007 | Ryu et al. |
| 2007/0177260 A1 | 8/2007 | Kuppenheimer et al. |
| 2007/0236959 A1 | 10/2007 | Tolbert et al. |
| 2007/0284093 A1 | 12/2007 | Bhatti et al. |
| 2008/0007511 A1 | 1/2008 | Tsuboi et al. |
| 2008/0043100 A1 | 2/2008 | Sobel et al. |
| 2008/0043425 A1 | 2/2008 | Hebert et al. |
| 2008/0088603 A1 | 4/2008 | Eliasson et al. |
| 2008/0088624 A1 | 4/2008 | Long et al. |
| 2008/0106677 A1 | 5/2008 | Kuan et al. |
| 2008/0117341 A1 | 5/2008 | McGrew |
| 2008/0141681 A1 | 6/2008 | Arnold |
| 2008/0150913 A1 | 6/2008 | Bell et al. |
| 2008/0174735 A1 | 7/2008 | Quach et al. |
| 2008/0232680 A1 | 9/2008 | Berestov et al. |
| 2008/0248852 A1 | 10/2008 | Rasmussen |
| 2008/0280682 A1 | 11/2008 | Brunner et al. |
| 2008/0285140 A1 | 11/2008 | Amitai |
| 2008/0297535 A1 | 12/2008 | Reinig |
| 2008/0303918 A1 | 12/2008 | Keithley |
| 2008/0311386 A1 | 12/2008 | Wendt |
| 2009/0002939 A1 | 1/2009 | Baugh et al. |
| 2009/0015742 A1 | 1/2009 | Liao et al. |
| 2009/0021908 A1 | 1/2009 | Patel et al. |
| 2009/0051283 A1 | 2/2009 | Cok et al. |
| 2009/0084525 A1 | 4/2009 | Satou et al. |
| 2009/0084757 A1 | 4/2009 | Erokhin et al. |
| 2009/0092261 A1 | 4/2009 | Bard |
| 2009/0097127 A1 | 4/2009 | Amitai |
| 2009/0115783 A1 | 5/2009 | Eichenlaub |
| 2009/0128449 A1 | 5/2009 | Brown et al. |
| 2009/0128901 A1 | 5/2009 | Tilleman et al. |
| 2009/0180250 A1 | 7/2009 | Holling et al. |
| 2009/0189974 A1 * | 7/2009 | Deering .................. G09G 3/02 348/46 |
| 2009/0190003 A1 | 7/2009 | Park et al. |
| 2009/0195756 A1 | 8/2009 | Li et al. |
| 2009/0222147 A1 | 9/2009 | Nakashima et al. |
| 2009/0244413 A1 | 10/2009 | Ishikawa et al. |
| 2009/0246707 A1 | 10/2009 | Li et al. |
| 2009/0256837 A1 * | 10/2009 | Deb et al. ...................... 345/419 |
| 2009/0262419 A1 | 10/2009 | Robinson et al. |
| 2010/0002989 A1 | 1/2010 | Tokushima |
| 2010/0018858 A1 | 1/2010 | Seki |
| 2010/0021108 A1 | 1/2010 | Kang et al. |
| 2010/0053151 A1 * | 3/2010 | Marti et al. .................... 345/419 |
| 2010/0060551 A1 | 3/2010 | Sugiyama et al. |
| 2010/0061078 A1 | 3/2010 | Kim |
| 2010/0084674 A1 | 4/2010 | Paetzold et al. |
| 2010/0096617 A1 | 4/2010 | Shanks |
| 2010/0103078 A1 | 4/2010 | Mukawa et al. |
| 2010/0134534 A1 | 6/2010 | Seesselberg et al. |
| 2010/0141905 A1 | 6/2010 | Burke |
| 2010/0149073 A1 | 6/2010 | Chaum et al. |
| 2010/0188353 A1 | 7/2010 | Yoon et al. |
| 2010/0200736 A1 | 8/2010 | Laycock et al. |
| 2010/0201953 A1 | 8/2010 | Freeman et al. |
| 2010/0213467 A1 | 8/2010 | Lee et al. |
| 2010/0220439 A1 | 9/2010 | Qin |
| 2010/0229853 A1 | 9/2010 | Vandal et al. |
| 2010/0238270 A1 | 9/2010 | Bjelkhagen et al. |
| 2010/0238664 A1 | 9/2010 | Steenbergen |
| 2010/0245387 A1 | 9/2010 | Bachelder et al. |
| 2010/0259889 A1 | 10/2010 | Chen et al. |

(56) References Cited

U.S. PATENT DOCUMENTS

| | | |
|---|---|---|
| 2010/0271467 A1 | 10/2010 | Akeley |
| 2010/0277421 A1 | 11/2010 | Charlier et al. |
| 2010/0277439 A1 | 11/2010 | Charlier et al. |
| 2010/0277779 A1 | 11/2010 | Futterer et al. |
| 2010/0281439 A1 | 11/2010 | Markovic et al. |
| 2010/0287485 A1 | 11/2010 | Bertolami et al. |
| 2010/0300654 A1 | 12/2010 | Edwards |
| 2010/0309687 A1 | 12/2010 | Sampsell et al. |
| 2010/0315781 A1 | 12/2010 | Agostini |
| 2010/0317132 A1 | 12/2010 | Rogers et al. |
| 2010/0321609 A1 | 12/2010 | Qi et al. |
| 2010/0328351 A1 | 12/2010 | Tan |
| 2011/0012814 A1 | 1/2011 | Tanaka |
| 2011/0021251 A1 | 1/2011 | Lindén |
| 2011/0025605 A1 | 2/2011 | Kwitek |
| 2011/0032482 A1 | 2/2011 | Agurok |
| 2011/0050547 A1 | 3/2011 | Mukawa |
| 2011/0050655 A1 | 3/2011 | Mukawa |
| 2011/0063795 A1 | 3/2011 | Yeh et al. |
| 2011/0068699 A1 | 3/2011 | Knapp |
| 2011/0075442 A1 | 3/2011 | Chiang |
| 2011/0084893 A1 | 4/2011 | Lee et al. |
| 2011/0090343 A1 | 4/2011 | Alt et al. |
| 2011/0091156 A1 | 4/2011 | Laughlin |
| 2011/0114823 A1 | 5/2011 | Katzir et al. |
| 2011/0127024 A1 | 6/2011 | Patel et al. |
| 2011/0134017 A1 | 6/2011 | Burke |
| 2011/0134645 A1 | 6/2011 | Hitchcock et al. |
| 2011/0141388 A1* | 6/2011 | Park et al. ............... 349/58 |
| 2011/0148931 A1 | 6/2011 | Kim |
| 2011/0149201 A1* | 6/2011 | Powell ............. G02F 1/133615 349/62 |
| 2011/0163986 A1* | 7/2011 | Lee ............. G06F 1/1692 345/173 |
| 2011/0194029 A1 | 8/2011 | Herrmann et al. |
| 2011/0205251 A1 | 8/2011 | Auld |
| 2011/0210946 A1 | 9/2011 | Goertz et al. |
| 2011/0214082 A1* | 9/2011 | Osterhout et al. ............. 715/773 |
| 2011/0215349 A1 | 9/2011 | An et al. |
| 2011/0221658 A1 | 9/2011 | Haddick et al. |
| 2011/0221659 A1 | 9/2011 | King et al. |
| 2011/0222236 A1 | 9/2011 | Luo et al. |
| 2011/0227820 A1 | 9/2011 | Haddick et al. |
| 2011/0227913 A1* | 9/2011 | Hyndman ............. 345/419 |
| 2011/0242145 A1 | 10/2011 | Nishimura et al. |
| 2011/0242392 A1 | 10/2011 | Chiang |
| 2011/0242757 A1 | 10/2011 | Tracy et al. |
| 2011/0248904 A1 | 10/2011 | Miyawaki et al. |
| 2011/0248958 A1 | 10/2011 | Gruhlke et al. |
| 2011/0267799 A1 | 11/2011 | Epstein et al. |
| 2011/0283223 A1 | 11/2011 | Vaittinen et al. |
| 2011/0299044 A1 | 12/2011 | Yeh et al. |
| 2011/0304640 A1 | 12/2011 | Noge |
| 2011/0309378 A1 | 12/2011 | Lau et al. |
| 2011/0310232 A1 | 12/2011 | Wilson et al. |
| 2011/0310312 A1 | 12/2011 | Yokote et al. |
| 2012/0013651 A1 | 1/2012 | Trayner et al. |
| 2012/0019434 A1* | 1/2012 | Kuhlman ............. G02F 1/13306 345/1.3 |
| 2012/0026161 A1 | 2/2012 | Chen et al. |
| 2012/0033306 A1 | 2/2012 | Valera et al. |
| 2012/0038629 A1 | 2/2012 | Brown et al. |
| 2012/0041721 A1 | 2/2012 | Chen |
| 2012/0050144 A1 | 3/2012 | Morlock et al. |
| 2012/0052934 A1 | 3/2012 | Maharbiz et al. |
| 2012/0062998 A1 | 3/2012 | Schultz et al. |
| 2012/0069413 A1 | 3/2012 | Schultz |
| 2012/0083325 A1 | 4/2012 | Heatherly |
| 2012/0102438 A1 | 4/2012 | Robinson et al. |
| 2012/0105487 A1* | 5/2012 | Son ............. G06F 3/0487 345/671 |
| 2012/0106170 A1 | 5/2012 | Matthews et al. |
| 2012/0111544 A1 | 5/2012 | Senatori |
| 2012/0113092 A1 | 5/2012 | Bar-Zeev et al. |
| 2012/0127577 A1 | 5/2012 | Desserouer |
| 2012/0157114 A1* | 6/2012 | Alameh et al. ............. 455/456.1 |
| 2012/0162764 A1 | 6/2012 | Shimizu |
| 2012/0176474 A1 | 7/2012 | Border |
| 2012/0182687 A1 | 7/2012 | Dighde et al. |
| 2012/0188205 A1 | 7/2012 | Jansson et al. |
| 2012/0200495 A1 | 8/2012 | Johansson |
| 2012/0206589 A1 | 8/2012 | Crandall |
| 2012/0206880 A1 | 8/2012 | Andres et al. |
| 2012/0218301 A1 | 8/2012 | Miller |
| 2012/0227006 A1 | 9/2012 | Amm |
| 2012/0235885 A1 | 9/2012 | Miller et al. |
| 2012/0242561 A1 | 9/2012 | Sugihara |
| 2012/0242798 A1 | 9/2012 | McArdle |
| 2012/0249797 A1 | 10/2012 | Haddick et al. |
| 2012/0256856 A1 | 10/2012 | Suzuki et al. |
| 2012/0256963 A1 | 10/2012 | Suzuki et al. |
| 2012/0287381 A1 | 11/2012 | Li et al. |
| 2012/0292535 A1 | 11/2012 | Choi et al. |
| 2013/0000871 A1 | 1/2013 | Olson et al. |
| 2013/0027772 A1 | 1/2013 | Large |
| 2013/0033485 A1 | 2/2013 | Kollin et al. |
| 2013/0081779 A1 | 4/2013 | Liao et al. |
| 2013/0093741 A1 | 4/2013 | Akimoto et al. |
| 2013/0106674 A1* | 5/2013 | Wheeler et al. ............. 345/8 |
| 2013/0155070 A1 | 6/2013 | Luo |
| 2013/0162673 A1 | 6/2013 | Bohn |
| 2013/0163089 A1 | 6/2013 | Bohn |
| 2013/0170031 A1 | 7/2013 | Bohn |
| 2013/0186596 A1 | 7/2013 | Rubenstein |
| 2013/0186598 A1 | 7/2013 | Rubenstein |
| 2013/0187943 A1 | 7/2013 | Bohn et al. |
| 2013/0201285 A1 | 8/2013 | Mao et al. |
| 2013/0207896 A1 | 8/2013 | Robinson et al. |
| 2013/0207964 A1 | 8/2013 | Fleck |
| 2013/0208003 A1 | 8/2013 | Bohn |
| 2013/0208362 A1 | 8/2013 | Bohn |
| 2013/0208482 A1 | 8/2013 | Fleck |
| 2013/0215081 A1 | 8/2013 | Levin et al. |
| 2013/0242056 A1 | 9/2013 | Fleck |
| 2013/0242555 A1 | 9/2013 | Mukawa |
| 2013/0249895 A1 | 9/2013 | Westerinen et al. |
| 2013/0250431 A1 | 9/2013 | Robbins et al. |
| 2013/0252628 A1 | 9/2013 | Kuehnel |
| 2013/0257848 A1 | 10/2013 | Westerinen |
| 2013/0258701 A1 | 10/2013 | Westerinen et al. |
| 2013/0267309 A1 | 10/2013 | Robbins |
| 2013/0294030 A1 | 11/2013 | Wang et al. |
| 2013/0307875 A1 | 11/2013 | Anderson |
| 2013/0314793 A1 | 11/2013 | Robbins |
| 2013/0322810 A1 | 12/2013 | Robbins |
| 2013/0332159 A1 | 12/2013 | Federighi et al. |
| 2013/0335671 A1 | 12/2013 | Fleck et al. |
| 2013/0342674 A1 | 12/2013 | Dixon |
| 2014/0010265 A1 | 1/2014 | Peng |
| 2014/0041827 A1 | 2/2014 | Giaimo |
| 2014/0078130 A1 | 3/2014 | Uchino et al. |
| 2014/0094973 A1 | 4/2014 | Giaimo et al. |
| 2014/0104665 A1 | 4/2014 | Popovich et al. |
| 2014/0104685 A1 | 4/2014 | Bohn |
| 2014/0111865 A1 | 4/2014 | Kobayashi |
| 2014/0140653 A1 | 5/2014 | Brown et al. |
| 2014/0140654 A1 | 5/2014 | Brown et al. |
| 2014/0176528 A1 | 6/2014 | Robbins |
| 2014/0184699 A1 | 7/2014 | Ito et al. |
| 2014/0204455 A1 | 7/2014 | Popovich |
| 2014/0240842 A1 | 8/2014 | Nguyen et al. |
| 2014/0320399 A1 | 10/2014 | Kim et al. |
| 2015/0168731 A1 | 6/2015 | Robbins |
| 2015/0227231 A1 | 8/2015 | Chen |
| 2016/0033697 A1 | 2/2016 | Sainiemi et al. |
| 2016/0035539 A1 | 2/2016 | Sainiemi et al. |
| 2016/0231570 A1 | 8/2016 | Levola et al. |
| 2016/0234485 A1 | 8/2016 | Robbins et al. |
| 2016/0282625 A1 | 9/2016 | Fleck et al. |
| 2017/0140577 A1 | 5/2017 | Westerinen et al. |
| 2017/0163977 A1 | 6/2017 | Fleck et al. |

(56) References Cited

U.S. PATENT DOCUMENTS

| | | |
|---|---|---|
| 2017/0301270 A1 | 10/2017 | Bohn et al. |
| 2017/0326446 A1 | 11/2017 | Robbins et al. |

FOREIGN PATENT DOCUMENTS

| | | |
|---|---|---|
| CN | 1440513 | 9/2003 |
| CN | 1714326 A | 12/2005 |
| CN | 101029968 | 9/2007 |
| CN | 101589326 A | 11/2009 |
| CN | 102096235 | 12/2009 |
| CN | 201491069 U | 5/2010 |
| CN | 101881936 A | 11/2010 |
| CN | 102004315 | 4/2011 |
| CN | 102156555 A | 8/2011 |
| DE | 102007021036 A1 | 11/2008 |
| EP | 0977022 | 2/2000 |
| EP | 1494109 | 1/2005 |
| EP | 1748370 | 1/2007 |
| EP | 2065750 A2 | 6/2009 |
| EP | 2112547 | 10/2009 |
| EP | 2216678 | 1/2010 |
| EP | 2700987 A1 | 2/2014 |
| EP | 3018524 A1 | 5/2016 |
| JP | H02227340 A | 9/1990 |
| JP | H0422358 | 1/1992 |
| JP | 7311303 | 11/1995 |
| JP | H08163602 A | 6/1996 |
| JP | H08190640 A | 7/1996 |
| JP | 2000013818 A | 1/2000 |
| JP | 2000276613 | 10/2000 |
| JP | 2001078234 | 3/2001 |
| JP | 2002358032 A | 12/2002 |
| JP | 2002365589 A | 12/2002 |
| JP | 2003005128 A | 1/2003 |
| JP | 2004219664 A | 8/2004 |
| JP | 2005172851 A | 6/2005 |
| JP | 2005309638 A | 11/2005 |
| JP | 2006195333 A | 7/2006 |
| JP | 2006267887 A | 10/2006 |
| JP | 2006349921 A | 12/2006 |
| JP | 2008015125 A | 1/2008 |
| JP | 2008017135 | 1/2008 |
| JP | 2008097599 A | 4/2008 |
| JP | 2008518368 A | 5/2008 |
| JP | 2009187290 A | 8/2009 |
| JP | 2010061545 A | 3/2010 |
| JP | 2012042654 A | 3/2012 |
| KR | 20090076539 | 7/2009 |
| KR | 10-20110070087 A | 6/2011 |
| KR | 10-20120023458 A | 3/2012 |
| TW | 200846700 A | 12/2008 |
| WO | WO-9418595 | 8/1994 |
| WO | WO-2001033282 | 5/2001 |
| WO | WO-0195027 | 12/2001 |
| WO | WO-03090611 | 11/2003 |
| WO | WO-2006054056 | 5/2006 |
| WO | WO-2008021504 | 2/2008 |
| WO | WO-2009077601 | 6/2009 |
| WO | 2011106797 | 2/2010 |
| WO | WO-2010125337 | 11/2010 |
| WO | WO-2011003381 | 1/2011 |
| WO | 2011041466 A1 | 4/2011 |
| WO | WO-2011051660 | 5/2011 |
| WO | WO-2011090455 | 7/2011 |
| WO | 2011110728 | 9/2011 |
| WO | WO-2011110728 | 9/2011 |
| WO | WO-2011131978 | 10/2011 |
| WO | WO-2012172295 | 12/2012 |
| WO | WO-2013093906 | 6/2013 |
| WO | 2013164665 A1 | 11/2013 |
| WO | WO-2014130383 | 8/2014 |

OTHER PUBLICATIONS

"PCT Search Report and Written Opinion", Application No. PCT/US2013/028477, dated Jun. 21, 2013, 11 pages.

"PCT Search Report and Written Opinion", Application No. PCT/US2013/031111, dated Jun. 26, 2013, 11 pages.

"Two-Faced: Transparent Phone with Dual Touch Screens", Retrieved from <http://gajitz.com/two-faced-transparent-phone-with-dual-touch-screens/>, Jun. 7, 2012, 3 pages.

Baudisch, et al., "Back-of-Device Interaction Allows Creating Very Small Touch Devices", In Proceedings of 27th International Conference on Human Factors in Computing Systems, Retrieved from <http://citeseerx.ist.psu.edu/viewdoc/download?doi=10.1.1.160.3337&rep=rep1&type=pdf>,Apr. 2005, 10 pages.

Chen, et al., "Strategies for 3D Video with Wide Fields-of-View", IEEE Proceeding Optoelectronics, vol. 148, Issue 2, Available at <http://ieeexplore.ieee.org/stamp/stamp.jsp?tp=&arnumber=926823>,Apr. 2001, pp. 85-90.

Eadicicco, "First Transparent Tablet Lets You Touch From Both Sides", Retrieved from <http://blog.laptopmag.com/first-transparent-tablet>, Dec. 26, 2013, 4 pages.

Scott, et al., "RearType: Text Entry Using Keys on the Back of a Device", In Proceedings of 12th Conference on Human-Computer Interaction with Mobile Devices and Services, Retrieved from <https://research.microsoft.com/pubs/135609/reartype%20mobilehci.pdf>,Sep. 7, 2010, 9 pages.

Travis, et al., "The Design of Backlights for View-Sequential 3D", Microsoft Corporation, Available at <http://download.microsoft.com/download/D/2/E/D2E425F8-CF3C-4C71-A4A2-70F9D4081007/Backlightforviewsequentialautostereo.docx>,Jul. 3, 2010, 4 pages.

Van "A Survey of Augmented Reality Technologies, Applications and Limitations", The International Journal of Virtual Reality, 2010, 9(2), Available at <http://www.ijvr.org/issues/issue2-2010/paper1%20.pdf>,Jun. 2010, pp. 1-19.

Westerinen, et al., "Light Guide Display and Field of View", U.S. Appl. No. 13/428,879, filed Mar. 23, 2012, 46 pages.

Wigdor, et al., "LucidTouch: A See-Through Mobile Device", In Proceedings of 20th Annual ACM symposium on User Interface Software and Technology, Retrieved from <http://dl.acm.org/citation.cfm?id=1294259>,Oct. 7, 2007, 10 pages.

Deagazi, David, "Selecting Display Backlighting for Portable, Handheld Devices", Retrieved at «http://www2.electronicproducts.com/Selecting_display_backlighting_for_portable_handheld_devices-article-farcglobal-feb2008-html.aspx», Jan. 2, 2008, pp. 4.

"Light Guide Techniques using LED Lamps", Retrieved at «http://www.ciri.org.nz/downloads/Lightpipe%20design.pdf», Oct. 14, 2008, pp. 22.

"Non-Final Office Action", U.S. Appl. No. 13/428,879, dated Mar. 17, 2014, 10 pages.

"Non-Final Office Action", U.S. Appl. No. 13/432,372, dated May 9, 2014, 26 pages.

"Advisory Action", U.S. Appl. No. 13/428,879, dated Sep. 19, 2014, 3 pages.

"Final Office Action", U.S. Appl. No. 13/428,879, dated Jul. 14, 2014, 12 pages.

"Final Office Action", U.S. Appl. No. 13/440,165, dated Jun. 6, 2014, 12 pages.

"Non-Final Office Action", U.S. Appl. No. 13/440,165, dated Feb. 6, 2014, 12 pages.

"Foreign Office Action", EP Application No. 13769961.7, dated Mar. 11, 2015, 8 pages.

"Foreign Office Action", EP Application No. 13770174.4, dated Mar. 11, 2015, 8 pages.

"Non-Final Office Action", U.S. Appl. No. 13/336,873, dated Apr. 9, 2015, 18 pages.

"Non-Final Office Action", U.S. Appl. No. 13/397,495, dated Apr. 3, 2015, 11 pages.

"Non-Final Office Action", U.S. Appl. No. 14/178,731, dated Apr. 17, 2015, 10 pages.

(56) References Cited

OTHER PUBLICATIONS

"Supplementary European Search Report", EP Application No. 13769961.7, dated Mar. 3, 2015, 3 pages.
"Supplementary European Search Report", EP Application No. 13770174.4, dated Mar. 3, 2015, 3 pages.
"Augmented Reality and Physical Games", U.S. Appl. No. 13/440,165, filed Apr. 5, 2012, 49 pages.
"Corrected Notice of Allowance", U.S. Appl. No. 13/355,836, dated Sep. 11, 2014, 2 pages.
"Corrected Notice of Allowance", U.S. Appl. No. 13/355,836, dated Dec. 15, 2014, 2 pages.
"DigiLens", SBG Labs, retrieved from <http://www.digilens.com/products.html> on Jun. 19, 2012, 1 page.
"Final Office Action", U.S. Appl. No. 13/336,873, dated Jan. 5, 2015, 21 pages.
"Final Office Action", U.S. Appl. No. 13/336,895, dated May 27, 2014, 11 pages.
"Final Office Action", U.S. Appl. No. 13/355,836, dated Mar. 10, 2014, 18 pages.
"Final Office Action", U.S. Appl. No. 13/355,914, dated Feb. 23, 2015, 21 pages.
"Final Office Action", U.S. Appl. No. 13/355,914, dated Jun. 19, 2014, 11 pages.
"Final Office Action", U.S. Appl. No. 13/397,495, dated May 29, 2014, 10 pages.
"Final Office Action", U.S. Appl. No. 13/397,516, dated Jan. 29, 2015, 13 pages.
"Final Office Action", U.S. Appl. No. 13/432,372, dated Jan. 29, 2015, 33 pages.
"Final Office Action", U.S. Appl. No. 13/477,646, dated Feb. 23, 2015, 36 pages.
"Final Office Action", U.S. Appl. No. 13/477,646, dated May 5, 2014, 26 pages.
"Final Office Action", U.S. Appl. No. 13/525,649, dated Oct. 9, 2014, 8 pages.
"Final Office Action", U.S. Appl. No. 14/134,993, dated Aug. 20, 2014, 15 pages.
"Foreign Notice of Allowance", CN Application No. 201320034345.X, dated Aug. 14, 2013, 2 Pages.
"Foreign Office Action", CN Application No. 201210563730.3, dated Jan. 7, 2015, 16 pages.
"Foreign Office Action", CN Application No. 201210567932.5, dated Aug. 14, 2014, 12 pages.
"HDTV Helmet Mounted Display", Available at <http://defense-update.com/products/h/HDTV-HMD.htm>,Jan. 26, 2005, 1 page.
"International Search Report and Written Opinion", Application No. PCT/US2014/016658, 10 pages.
"International Search Report and Written Opinion", Application No. PCT/US2012/069331, dated Mar. 29, 2013, 10 pages.
"International Search Report and Written Opinion", Application No. PCT/US2013/053676, dated Oct. 16, 2013, 10 pages.
"International Search Report and Written Opinion", Application No. PCT/US2013/076832, dated Mar. 17, 2014, 12 pages.
"International Search Report and Written Opinion", Application No. PCT/US2013/061225, dated Jun. 4, 2014, 12 pages.
"International Search Report and Written Opinion", Application No. PCT/US2012/071563, dated Apr. 25, 2013, 13 pages.
"International Search Report and Written Opinion", Application No. PCT/US2013/021784, dated Apr. 30, 2013, 9 pages.
"International Search Report and Written Opinion", Application No. PCT/US2012/069330, dated Mar. 28, 2013, 9 pages.
"International Search Report and Written Opinion", Application No. PCT/US2013/021783, dated May 15, 2013, 9 pages.
"International Search Report and Written Opinion", Application No. PCT/US2013/026200, dated Jun. 3, 2013, 9 pages.
"Non-Final Office Action", U.S. Appl. No. 13/397,495, dated Nov. 13, 2013, 8 pages.
"Non-Final Office Action", U.S. Appl. No. 13/336,873, dated Jul. 25, 2014, 16 pages.
"Non-Final Office Action", U.S. Appl. No. 13/336,895, dated Oct. 24, 2013, 9 pages.
"Non-Final Office Action", U.S. Appl. No. 13/343,675, dated Jul. 16, 2013, 9 pages.
"Non-Final Office Action", U.S. Appl. No. 13/355,836, dated Nov. 4, 2013, 15 pages.
"Non-Final Office Action", U.S. Appl. No. 13/355,914, dated Feb. 14, 2014, 10 pages.
"Non-Final Office Action", U.S. Appl. No. 13/355,914, dated Oct. 28, 2014, 18 pages.
"Non-Final Office Action", U.S. Appl. No. 13/397,516, dated Jun. 12, 2014, 11 pages.
"Non-Final Office Action", U.S. Appl. No. 13/397,516, dated Nov. 25, 2013, 10 pages.
"Non-Final Office Action", U.S. Appl. No. 13/397,539, dated Mar. 16, 2015, 9 pages.
"Non-Final Office Action", U.S. Appl. No. 13/397,617, dated Oct. 9, 2014, 6 pages.
"Non-Final Office Action", U.S. Appl. No. 13/428,879, dated Feb. 24, 2015, 10 pages.
"Non-Final Office Action", U.S. Appl. No. 13/440,165, dated Feb. 13, 2015, 10 pages.
"Non-Final Office Action", U.S. Appl. No. 13/477,646, dated Oct. 6, 2014, 34 pages.
"Non-Final Office Action", U.S. Appl. No. 13/477,646, dated Nov. 22, 2013, 20 pages.
"Non-Final Office Action", U.S. Appl. No. 13/525,649, dated Jan. 29, 2014, 7 pages.
"Non-Final Office Action", U.S. Appl. No. 13/525,649, dated Feb. 5, 2015, 7 pages.
"Non-Final Office Action", U.S. Appl. No. 13/525,649, dated Jun. 5, 2014, 7 pages.
"Non-Final Office Action", U.S. Appl. No. 13/570,073, dated Jan. 23, 2015, 7 pages.
"Non-Final Office Action", U.S. Appl. No. 13/631,308, dated Feb. 23, 2015, 9 pages.
"Non-Final Office Action", U.S. Appl. No. 13/774,875, dated Nov. 24, 2014, 8 pages.
"Non-Final Office Action", U.S. Appl. No. 14/134,993, dated Jan. 22, 2015, 17 pages.
"Non-Final Office Action", U.S. Appl. No. 14/134,993, dated Apr. 17, 2014, 34 pages.
"Notice of Allowance", U.S. Appl. No. 13/336,895, dated Aug. 11, 2014, 6 pages.
"Notice of Allowance", U.S. Appl. No. 13/343,675, dated Sep. 16, 2013, 8 pages.
"Notice of Allowance", U.S. Appl. No. 13/355,836, dated Jun. 13, 2014, 11 pages.
"Notice of Allowance", U.S. Appl. No. 13/355,836, dated Oct. 8, 2014, 11 pages.
"Notice of Allowance", U.S. Appl. No. 13/356,545, dated Mar. 28, 2014, 6 pages.
"Notice of Allowance", U.S. Appl. No. 13/488,145, dated Nov. 19, 2014, 8 pages.
"Restriction Requirement", U.S. Appl. No. 13/355,836, dated Sep. 27, 2013, 6 pages.
"Restriction Requirement", U.S. Appl. No. 13/397,539, dated Dec. 1, 2014, 6 pages.
"Restriction Requirement", U.S. Appl. No. 13/488,145, dated Sep. 8, 2014, 14 pages.
"Restriction Requirement", U.S. Appl. No. 13/570,073, dated Nov. 18, 2014, 7 pages.
"Supplemental Notice of Allowance", U.S. Appl. No. 13/356,545, dated Jul. 22, 2014, 2 pages.
"Written Opinion", Application No. PCT/US2013/061225, dated Oct. 10, 2014, 6 Pages.
Allen, "ELiXIR—Solid-State Luminaire with Enhanced Light Extraction by Internal Reflection", Journal of Display Technology, vol. 3, No. 2, Available at <http://www.nanolab.uc.edu/Publications/PDFfiles/355.pdf>,Jun. 2007, pp. 155-159.
Aron, "'Sprinting' chips could push phones to the speed limit", New Scientist, Feb. 20, 2012, Issue #2852, Feb. 20, 2012, 2 pages.

(56) References Cited

OTHER PUBLICATIONS

Baluja, et al., "Non-Intrusive Gaze Tracking Using Artificial Neural Networks", Technical Report CMU-CS-94-102, Available at <http://citeseerx.ist.psu.edu/viewdoc/download?doi=10.1.1.33.4027&rep=rep1&type=pdf >,Jan. 5, 1994, 14 pages.
Barger, "COTS Cooling", Publication of the National Electronics Manufacturing Center of Excellence, Retrieved from: <http://www.empf.org/empfasis/2009/Oct09/cots.html > on Jul. 9, 2012,Oct. 2009, 4 pages.
Baxtor, "TwinTech GeForce GTS 250 XT OC 1GB Graphics Card", retrieved from <http://www.tweaktown.com/reviews/2733/twintech_geforce_gts_250_xt_oc_1gb_graphics_card/index3.html> on Dec. 30, 2011,Apr. 24, 2009, 4 pages.
Cheng, et al., "Waveguide Displays Based on Polymer-dispersed Liquid Crystals", SPIE Newsroom, Available at <http://spie.org/documents/Newsroom/Imported/003805/003805_10.pdf>,Aug. 12, 2011, 2 pages.
Chirgwin, "Researchers propose 'overclock' scheme for mobiles—Processing at a sprint to overcome tech limitations", The Register, Feb. 21, 2012, Feb. 21, 2012, 2 pages.
Coldewey, "Researchers Propose "Computational Sprinting" to Speed Up Chips by 1000%—But Only for a Second", TechCrunch, Feb. 28, 2012, Feb. 29, 2012, 2 pages.
Greenemeier, "Could "Computational Sprinting" Speed Up Smart Phones without Burning Them Out?", Scientific American, Feb. 29, 2012, Feb. 29, 2012, 2 pages.
Han, et al., "Accurate diffraction efficiency control for multiplexed volume holographic gratings", Retrieved at: opticalengineering.spiedigitallibrary.org/data/Journals/.../2799_1, 2002, 4 pages.
Hua, et al., "Engineering of Head-mounted Projective Displays", In Proceedings of Applied Optics, vol. 39, No. 22, Aug. 1, 2000, 11 pages.
Jacques, et al., "Polarized Light Imaging of Tissue", Available at <http://www.lumamed.com/documents/5_polarized%20light%20imaging.pdf>,2004, 17 pages.
Jarvenpaa, et al., "Compact near-to-eye display with integrated gaze tracker", Second International Conference on Computer Engineering and Applications, Mar. 19, 2010, 9 pages.
Jaworski, et al., "A Novel Design of Heat Sink with PCM for Electronics Cooling", 10th International Conference on Thermal Energy Storage, Stockton, May 31-Jun. 2, 2006, retrieved from <https://intraweb.stockton.edu/eyos/energy_studies/content/docs/FINAL_PRESENTATIONS/4b-6%20.pdf> on Jan. 5, 2012,May 31, 2006, 8 pages.
Karp, et al., "Planar Micro-optic Solar Concentration using Multiple Imaging Lenses into a Common Slab Waveguide", In Proceedings of SPIE vol. 7407, Available at <http://psilab.ucsd.edu/research/slab_concentration/files/SPIE_Slab_Published.pdf>,Jan. 2009, 11 pages.
Kress, et al., "Exit Pupil for Wearable See-through displays", Downloaded From: http://proceedings.spiedigitallibrary.org/ on Jan. 31, 2015 Terms of Use: http://spiedl.org/terms, 2012, 8 pages.
Krishnan, et al., "A Novel Hybrid Heat Sink Using Phase Change Materials for Transient Thermal Management of Electronics", IEEE transactions on components and packaging technologies, vol. 28, No. 2, retrieved from <http://ieeexplore.ieee.org/stamp/stamp.jsp?tp=&arnumber=1432936> on Jan. 5, 2012,Jun. 2005, pp. 281-289.
Lanman, et al., "Near-eye Light Field Displays", In Journal of ACM Transactions on Graphics, vol. 32, No. 6, Nov. 2013, 10 pages.
Large, et al., "Parallel Optics in Waveguide Displays: a Flat Panel Autostereoscopic", Display Technology, Journal of, Retrieved from <http://download.microsoft.com/download/D/2/E/D2E425F8-CF3C-4C71-A4A2-70F9D4081007/ParallelOpticsinWaveguideDisplaysMS090925.Final.pdf>,Jun. 21, 2010, pp. 1-7.
Lerner, "Penn Helps Rethink Smartphone Design With 'Computational Sprinting'", Penn News Release, Feb. 28, 2012, 2 pages.
Li, et al., "Design Optimization of Reflective Polarizers for LCD Backlight Recycling", Journal of Display Technology, vol. 5, No. 8, Available at <http://ieeexplore.ieee.org/stamp/stamp.jsp?tp=&arnumber=5196840 >,Aug. 2009, pp. 335-340.
Li, et al., "Switchable Electro-optic Diffractive Lens with High Efficiency for Ophthalmic Applications", PNAS Apr. 18, 2006 vol. 103 No. 16 6100-6104, Retrieved from: <http://www.pnas.org/content/103/16/6100.long> Feb. 22, 2012,Feb. 2, 2006, 4 pages.
Man, et al., "IT Equipment Noise Emission Standards: Overview of New Development in the Next Edition of ISO/ECMA Standards", In Proceedings of 37th International Congress and Exposition on Noise Control Engineering, Available at <http://www.ecma-international.org/activities/Acoustics/Inter-noise%202008%20paper%20on%20ECMA-74%20updates.pdf >,Oct. 26, 2008, 8 pages.
Massenot, et al., "Multiplexed holographic transmission gratings recorded in holographic polymer-dispersed liquid crystals: static and dynamic studies", Retrieved at: http://oatao.univ-toulouse.fr/2874/, 2005, 8 pages.
McMillan, "Your Future iPhone May Be Stuffed With Wax", Aug. 23, 2013, 3 pages.
Melcher, "LCoS for High Performance Displays", In Proceedings of LEOS 2003, Available at <http://ieeexplore.ieee.org/stamp/stamp.jsp?tp=&arnumber=1253048>,Oct. 27, 2003, pp. 812-813.
Minier, et al., "Diffraction Characteristics of Superimposed Holographic gratings in Planar Optical waveguides", IEEE Photonics Technology Letters, vol. 4, No. 10, Oct. 1992, 4 pages.
Moore, "Computational sprinting pushes smartphones till they're tired", Michigan News Release, Feb. 28, 2012, 2 pages.
Nguyen, et al., "Advanced Cooling System Using Miniature Heat Pipes in Mobile PC", IEEE Transactions on Components and Packaging Technology, vol. 23, No. 1, Available at <http://ieeexplore.ieee.org/stamp/stamp.jsp?tp=&arnumber=833046&userType=inst>,Mar. 2000, pp. 86-90.
Owano, "Study explores computing bursts for smartphones", PhysOrg.com, Feb. 21, 2012, Feb. 21, 2012, 2 pages.
Papaefthymiou, et al., "Computational Sprinting on a Hardware/Software Testbed", In the Proceedings of the 18th Eighteenth International Conference on Architectural Support for Programming Languages and Operating Systems (ASPLOS), Mar. 2013., Mar. 2013, 12 pages.
Patrizio, "Researchers Working on Ways to Put 16-Core Processors in Smartphones", Brighthand, Mar. 18, 2012, Mar. 18, 2012, 2 pages.
Pu, et al., "Exposure schedule for multiplexing holograms in photopolymer films", Retrieved at: lo.epfl.ch/webdav/site/lo/shared/1996/OE_35_2824_Oct1996.pdf, Oct. 1996, 6 pages.
Raghavan, et al., "Computational Sprinting", In the Proceedings of the 18th Symposium on High Performance Computer Architecture (HPCA), Feb. 2012, Feb. 2012, 12 pages.
Raghavan, et al., "Designing for Responsiveness With Computational Sprinting", IEEE Micro's "Top Picks of 2012" Issue, May 2013, 8 pages.
Singh et al., "Laser-Based Head-Tracked 3D Display Research", Journal of Display Technology, vol. 6, No. 10, Available at <http://ieeexplore.ieee.org/stamp/stamp.jsp?tp=&arnumber=5462999>,Oct. 2010, pp. 531-543.
Stupar, et al., "Optimization of Phase Change Material Heat Sinks for Low Duty Cycle High Peak Load Power Supplies", IEEE transactions on components, packaging and manufacturing technology, retrieved from <http://ieeexplore.ieee.org/stamp/stamp.jsp?tp=&arnumber=6081913> on Jan. 5, 2012,Nov. 15, 2011, 14 pages.
Tari, et al., "CFD Analyses of a Notebook Computer Thermal Management System and a Proposed Passive Cooling Alternative", IEEE Transactions on Components and Packaging Technologies, vol. 33, No. 2, retrieved from <http://ieeexplore.ieee.org/stamp/stamp.jsp?tp=&arnumber=5466211> on Dec. 30, 2011,Jun. 2010, pp. 443-452.
Travis, et al., "Collimated Light from a Waveguide for a Display Backlight", Optics Express, Retrieved from <http://download.microsoft.com/download/D/2/E/D2E425F8-CF3C-4C71-A4A2-70F9D4081007/OpticsExpressbacklightpaper.pdf>,Oct. 15, 2009, pp. 19714-19719.
Walker, "Thermalright Ultra-120 Extreme CPU Cooler", retrieved from <http://www.pro-clockers.com/cooling/66-thermalright-ultra-120-extreme-cpu-cooler.html> on Dec. 30, 2011,Jul. 2, 2009, 7 pages.

(56) References Cited

OTHER PUBLICATIONS

Yan, et al., "Multiplexing holograms in the photopolymer with equal diffraction efficiency", 2005, 9 pages.
Zharkova, et al., "Study of the Dynamics of Transmission Gratings Growth on Holographic Polymer-Dispersed Liquid Crystals", International Conference on Methods of Aerophysical Research, ICMAR 2008, 2008, 4 pages.
"Non-Final Office Action", U.S. Appl. No. 13/440,165, dated Oct. 16, 2014, 11 pages.
"Non-Final Office Action", U.S. Appl. No. 13/432,372, dated Oct. 24, 2014, 27 pages.
"Final Office Action", U.S. Appl. No. 13/397,539, dated Jun. 29, 2015, 11 pages.
"Final Office Action", U.S. Appl. No. 13/440,165, dated Jul. 21, 2015, 11 pages.
"Final Office Action", U.S. Appl. No. 13/774,875, dated Jun. 4, 2015, 10 pages.
"Final Office Action", U.S. Appl. No. 14/134,993, dated Jul. 16, 2015, 19 pages.
"Final Office Action", U.S. Appl. No. 14/178,731, dated Aug. 12, 2015, 13 pages.
"Foreign Office Action", EP Application No. 13765041.2, dated Aug. 5, 2015, 6 pages.
"Foreign Office Action", EP Application No. 13769961.7, dated Jun. 30, 2015, 6 pages.
"Foreign Office Action", EP Application No. 13770174.4, dated Jul. 1, 2015, 6 pages.
"International Search Report and Written Opinion", Application No. PCT/US2015/014699, dated May 4, 2015, 16 Pages.
"Non-Final Office Action", U.S. Appl. No. 13/397,617, dated May 5, 2015, 6 pages.
"Non-Final Office Action", U.S. Appl. No. 13/428,879, dated Jun. 26, 2015, 13 pages.
"Non-Final Office Action", U.S. Appl. No. 13/432,372, dated Aug. 27, 2015, 35 pages.
"Non-Final Office Action", U.S. Appl. No. 13/477,646, dated Jun. 18, 2015, 43 pages.
"Non-Final Office Action", U.S. Appl. No. 13/722,917, dated May 21, 2015, 12 pages.
"Notice of Allowance", U.S. Appl. No. 13/336,873, dated Jul. 31, 2015, 6 pages.
"Restriction Requirement", U.S. Appl. No. 13/420,388, dated Aug. 13, 2015, 6 pages.
"Supplementary European Search Report", EP Application No. 13765041.2, dated Jul. 21, 2015, 3 pages.
Travis,"Wedge Optics in Flat Panel Displays", Retrieved from: http://download.microsoft.com/download/4/B/4/4B49C1C2-4C7A-4CEA-ADB5-EF4E4E7F5F63/Wedge%20optics%20in%20flat%20panel%20displays.pdf, Jul. 14, 2011, 15 Pages.
"Corrected Notice of Allowance", U.S. Appl. No. 13/336,873, dated Sep. 11, 2015, 4 pages.
"Final Office Action", U.S. Appl. No. 13/722,917, dated Sep. 23, 2015, 14 pages.
"Non-Final Office Action", U.S. Appl. No. 13/397,516, dated Sep. 24, 2015, 14 pages.
"Second Office Action Issued in Chinese Patent Application No. 201380017348.5", dated Jun. 17, 2016, 7 Pages.
"Office Action Received in Chinese Patent Application No. 201380017348.5", dated Jan. 14, 2016, 12 Pages.
"Third Office Action Issued in Chinese Patent Application No. 201380017348.5", dated Oct. 18, 2016, 7 Pages.
"International Search Report", dated Jun. 26, 2013, Application No. PCT/US2013/030632, Filed Date: Mar. 13, 2013, pp. 10.
"Office Action Issued in Japanese Patent Application No. 2015-501688", dated Dec. 5, 2017, 7 Pages.
"Office Action Issued in Japanese Patent Application No. 2015-501688", dated Jul. 4, 2017, 6 Pages.
"Office Action Issued in Japanese Patent Application No. 2015-503284", dated Aug. 16, 2017, 12 Pages.

"Office Action Issued in Japanese Patent Application No. 2015-503284", dated Dec. 22, 2016, 12 Pages.
"Office Action Issued in Japanese Patent Application No. 2015-549765", dated Nov. 1, 2017, 7 Pages.
"Office Action Issued in Japanese Patent Application No. 2017-018727", dated Feb. 21, 2018, 4 Pages.
Ando, et al., "Development of Three-Dimensional Microstages Using Inclined Deep-Reactive Ion Etching", In Journal of Microelectromechanical Systems, vol. 16, Issue 3, Jun. 1, 2007, pp. 613-621.
Gila, et al., "First Results From a Multi-len Beam Lithography and Processing System At the University of Florida", AIP Conference Proceedings, Jun. 1, 2011, 6 Pages.
"International Search Report & Written Opinion Issued in PCT Application No. PCT/US2015/041900", dated Oct. 21, 2015, 11 Pages.
"International Search Report & Written Opinion Issued in PCT Application No. PCT/US2015/041909", dated Oct. 20, 2015, 13 Pages.
"International Preliminary Report on Patentability Issued in PCT Application No. PCT/US2016/015496", dated May 4, 2017, 09 Pages.
"International Search Report and Written Opinion Issued in PCT Application No. PCT/US2016/015496", dated Apr. 11, 2016, 11 Pages.
"Second Written Opinion Issued in PCT Application No. PCT/US2016/015496", dated Feb. 9, 2017, 6 Pages.
"Second Written Opinion Issued in PCT Application No. PCT/US2016/015869", dated Jan. 20, 2017, 5 Pages.
"International Preliminary Report on Patentability Issued in PCT Application No. PCT/US2016/015871", dated May 15, 2017, 10 Pages.
"International Preliminary Report on Patentability Issued in PCT Application No. PCT/US2016/015873", dated May 15, 2017, 8 Pages.
"International Search Report and Written Opinion Issued in PCT Application No. PCT/US2016/015873", dated May 23, 2016, 11 Pages.
"Second Written Opinion Issued in PCT Application No. PCT/US2016/015873", dated Feb. 6, 2017, 6 Pages.
"Office Action Issued in Taiwan Patent Application No. 102101510", dated Dec. 6, 2016, 10 Pages.
"Final Office Action Issued in U.S. Appl. No. 13/397,539", dated Apr. 21, 2016, 14 Pages.
"Non Final Office Action Issued in U.S. Appl. No. 13/397,539", dated Oct. 1, 2015, 12 Pages.
"Non-Final Office Action Issued in U.S. Appl. No. 13/397,539", dated Sep. 9, 2016, 16 Pages.
"Final Office Action Issued in U.S. Appl. No. 13/397,617", dated Sep. 21, 2016, 10 Pages.
"Final Office Action Issued in U.S. Appl. No. 13/397,617", dated Nov. 18, 2015, 11 Pages.
"Non Final Office Action Issued in U.S. Appl. No. 13/397,617", dated May 18, 2016, 9 Pages.
"Non-Final Office Action Issued in U.S. Appl. No. 13/397,617", dated Jan. 12, 2017, 10 Pages.
"Final Office Action Issued in U.S. Appl. No. 13/420,388", dated Apr. 21, 2016, 9 Pages.
"Non Final Office Action Issued in U.S. Appl. No. 13/420,388", dated Dec. 4, 2015, 7 Pages.
"Final Office Action Issued in U.S. Appl. No. 13/428,879", dated Dec. 10, 2015, 16 Pages.
"Final Office Action Issued in U.S. Appl. No. 13/432,372", dated Mar. 18, 2016, 38 Pages.
"Non-Final Office Action Issued in U.S. Appl. No. 13/432,372", dated Jul. 1, 2016, 11 Pages.
"Non Final Office Action Issued in U.S. Appl. No. 13/440,165", dated Mar. 28, 2016, 13 Pages.
"Non-Final Office Action Issued in U.S. Appl. No. 13/440,165", dated Sep. 22, 2016, 13 Pages.
"Final Office Action Issued in U.S. Appl. No. 13/477,646", dated Nov. 24, 2015, 39 Pages.

(56) References Cited

OTHER PUBLICATIONS

"Final Office Action Issued in U.S. Appl. No. 13/722,917", dated Jun. 17, 2016, 20 Pages.
"Final Office Action Issued in U.S. Appl. No. 13/722,917", dated Jul. 12, 2017, 19 Pages.
"Non Final Office Action Issued in U.S. Appl. No. 13/722,917", dated Feb. 9, 2016, 17 Pages.
"Non-Final Office Action Issued in U.S. Appl. No. 13/722,917", dated Dec. 6, 2016, 19 Pages.
"Final Office Action Issued in U.S. Appl. No. 13/774,875", dated Apr. 22, 2016, 11 Pages.
"Non Final Office Action Issued in U.S. Appl. No. 13/774,875", dated Sep. 16, 2015, 9 Pages.
"Office Action Issued in European Patent Application No. 13765041.2", dated Aug. 4, 2016, 5 Pages.
"Office Action Issued in European Patent Application No. 13770174.4", dated Dec. 21, 2015, 6 Pages.
"Notice of Allowability Issued in U.S. Appl. No. 14/134,993", dated Mar. 2, 2016, 6 Pages.
"Non-Final Office Action Issued in U.S. Appl. No. 14/447,446", dated Jun. 9, 2017, 16 Pages.
"Final Office Action Issued in U.S. Appl. No. 14/617,606", dated Sep. 5, 2017, 15 Pages.
"Final Office Action Issued in U.S. Appl. No. 14/617,606", dated Dec. 27, 2016, 14 Pages.
"Non Final Office Action Issued in U.S. Appl. No. 14/617,606", dated Mar. 27, 2017, 15 Pages.
"Non Final Office Action Issued in U.S. Appl. No. 14/617,606", dated Sep. 9, 2016, 12 Pages.
"Non Final Office Action Issued in U.S. Appl. No. 14/617,606", dated May 23, 2016, 13 Pages.
"Ex Parte Quayle Action Issued in U.S. Appl. No. 14/617,769", dated Jun. 2, 2017, 7 Pages.
"Non Final Office Action Issued in U.S. Appl. No. 14/617,769", dated Jan. 12, 2017, 11 Pages.
"Restriction Requirement Issued in U.S. Appl. No. 14/635,474", dated Jul. 12 2016, 5 Pages.
"Non Final Office Action Issued in U.S. Appl. No. 15/171,924", dated Jul. 13, 2016, 9 Pages.
"Non Final Office Action Issued in U.S. Appl. No. 15/417,325", dated May 17, 2018, 9 Pages.
"Non-Final Office Action Issued in U.S. Appl. No. 15/642,020", dated Oct. 6, 2017, 14 Pages.
"Office Action Issued in Australian Patent Application No. 2013361148", dated Apr. 11, 2017, 3 Pages.
"Office Action Issued in Australian Patent Application No. 2013361148", dated Feb. 15, 2017, 3 Pages.
"First Office Action and Search Report Issued in Chinese Patent Application No. 201380015757.1", dated Jul. 11, 2016, 12 Pages.
"Office Action Issued in Chinesse Patent Application No. 201380015757.1", dated Dec. 19, 2017, 10 Pages.
"Second Office Action and Search Report Issued in Chinese Patent Application No. 201380015757.1", dated Mar. 27, 2017, 12 Pages.
"First Office Action and Search Report Issued in Chinese Patent Application No. 201380017346.6", dated Jan. 28, 2016, 11 Pages.
"Notice of Allowance Issued in Chinese Patent Application No. 201380017346.6", dated Oct. 9, 2017, 6 Pages.
"Second Office Action Issued in Chinese Patent Application No. 201380017346.6", dated Oct. 9, 2016, 6 Pages.
"Third Office Action Issued in Chinese Patent Application No. 201380017346.6", dated Jan. 25, 2017, 6 Pages.
"First Office Action and Search Report Issued in Chinese Patent Application No. 201380067523.1", dated Aug. 22, 2016, 12 Pages.
"Second Office Action Issued in Chinese Patent Application No. 201380067523.1", dated Apr. 17, 2017, 6 Pages.
"Office Action Issued in Russian Patent Application No. 2015124081", dated Nov. 14, 2017, 7 Pages. (W/O English Translation).
"Office Action Issued in Japan Patent Application No. 2015-501688", dated Dec. 20, 2016, 4 Pages.

\* cited by examiner

MOBILE DEVICE LIGHT GUIDE DISPLAY

BACKGROUND

Users are exposed to a wide range of display devices in their everyday lives. A user, for instance, may interact with mobile communication devices such as tablet computers and mobile phones when in a mobile setting, such as when traveling to and from work. The user may also interact with computers having traditional form factors, such as a laptop or desktop PC, at the user's work, home and so forth. The user may also watch a television, such as to play video games, watch movies and television programming, and so on.

Traditional display techniques that were employed by these devices however, could cause eye strain to users viewing the devices, especially when viewing the devices for significant amounts of time. This eye strain could therefore have an effect on a user's experience with the devices, as well as a physical effect on the user, such as to cause the user to wear glasses as a result of the strain.

SUMMARY

Light guide techniques are described. In one or more implementations, an apparatus includes a housing configured in a hand-held form factor, a light guide supported by the housing, a light engine disposed within the housing and optically coupled to the light guide, and one or more modules disposed within the housing and implemented at least partially in hardware. The one or more modules are configured to cause the light engine to output a user interface for display using the light guide along an image plane focused at infinity.

In one or more implementations, an apparatus includes a housing configured in a hand-held form factor, a light guide, supported by the housing, having a first side configured to be viewed by a user and a second side opposing the first side that includes one or more touch sensors, a light engine disposed within the housing and optically coupled to the light guide, and one or more modules disposed within the housing and implemented at least partially in hardware. The one or more modules are configured to cause the light engine to project a user interface for display using the light guide that is viewable via the first side and detect one or more inputs using the one or more touch sensors located via the second side, the one or more inputs usable to initiate one or more operations.

In one or more implementations, an apparatus includes a housing, a light guide supported by the housing having a first side that is viewable by a user, a second side opposing the first side, and switchable in-coupling optics. The apparatus also includes a light engine disposed within the housing and optically coupled to the in-coupling optics of the light guide and one or more modules disposed within the housing and implemented at least partially in hardware. The one or more modules are communicatively coupled to the switchable in-coupling optics to cause a switch between a first mode in which an output of the light engine is displayed through the first side of the light guide and a second mode in which an output of the light engine passes through the second side of the light guide.

In one or more implementations, an apparatus includes a housing configured in a hand-held form factor, one or more sensors configured to detect a position and orientation of the housing in three dimensions in a physical environment of the housing, a light guide that is at least partially transparent and supported by the housing, a light engine that is optically coupled to the light guide, and one or more modules disposed within the housing and implemented at least partially in hardware. The one or more modules are configured to calculate a position and orientation of an augmentation and cause the light engine to output the augmentation for display using the light guide such that the augmentation is viewable concurrently with at least a portion of the physical environment through the light guide.

In one or more implementations, one or more images of a user are captured using one or more cameras of a handheld device that is held by a user. A location of the user's pupils is calculated in three dimensional space from the captured one or more images by the handheld device. An augmentation is displayed on a transparent display of the handheld device based on the calculated location of the user's pupils that is viewable concurrently with at least a portion of a physical surroundings of the handheld device that is viewable through the transparent display.

In one or more implementations, an apparatus includes a housing configured in a hand-held form factor, one or more cameras positioned in the housing to track one or more eyes of a user, a light guide that is at least partially transparent and supported by the housing, a light engine that is optically coupled to the light guide, and one or more modules disposed within the housing and implemented at least partially in hardware. The one or more modules are configured to calculate a position of one or more pupils of the user in three-dimensional space and cause the light engine to output an augmentation for display based on the calculated position using the light guide such that the augmentation is viewable concurrently with at least a portion of the physical environment through the light guide.

In one or more implementations, a display device of a computing device is viewed at a first distance such that a first field of view of a user interface displayed by the display device is viewable. The display device of the computing device is viewed at a second distance that is less than the first distance such that a second field of view of the user interface displayed by the display device is viewable that is greater than the first field of view.

In one or more implementations, an apparatus includes one or more modules implemented at least partially in hardware to configure a user interface and a display device communicatively coupled to the one or more modules to output the user interface to be viewable by a user within a range of distances from the display device such that closer distances within the range permit the user to have an increased field of view in comparison with distances within the range that are further away from the user.

In one or more implementations, an apparatus includes one or more modules implemented at least partially in hardware to configure a user interface and a display device communicatively coupled to the one or more modules to output the user interface to be viewable by a user such that different portions of the user interface are viewable by the user depending on an angle of tilt of the display device in relation to one or more eyes of the user.

In one or more implementations, a display device includes a housing configured to be supported by a surface, a light guide supported by the housing, a light engine disposed within the housing and optically coupled to the light guide, and one or more modules disposed within the housing and implemented at least partially in hardware. The one or more modules are configured to cause the light engine to output a user interface for display using the light guide along an image plane focused at infinity.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
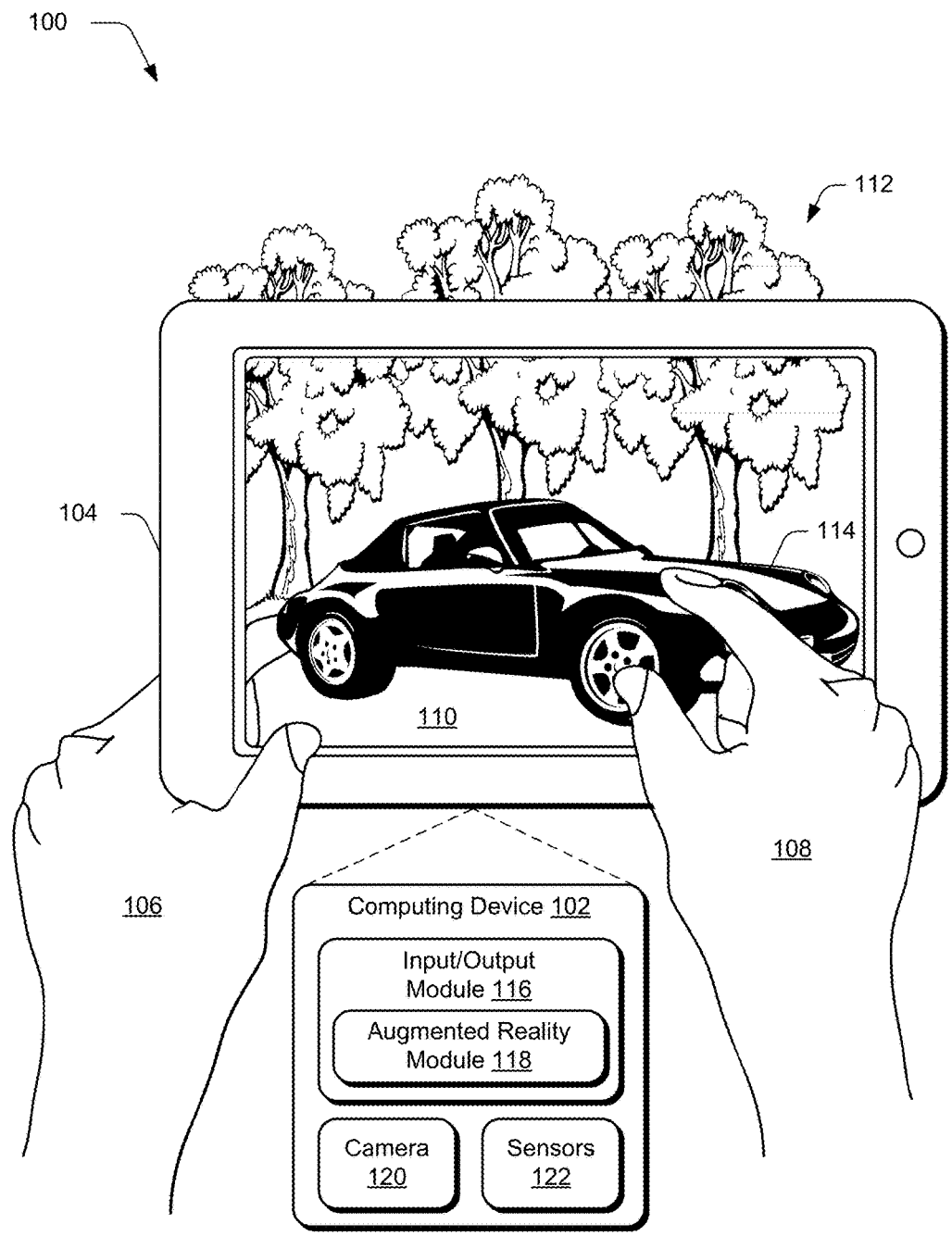
FIG. 1 is an illustration of an environment in an example implementation that is operable to employ light guide techniques as described herein.

Traditional techniques employed by display devices involved a display that is focused at an image plane that coincides with a surface of the device. Therefore, these traditional techniques could cause eyestrain to users that viewed the devices, which could physically affect the user as well as affect the user's experience with the devices.

Light guide techniques are described herein. In one or more implementations, a light guide is configured for use as a display device. The light guide, for instance, may be incorporated as part of a device having a handheld form factor, such as a tablet computer, mobile phone, portable gaming device, and so forth. The light guide may also be incorporated as part of a variety of other devices, such as a television, as part of a monitor for a desktop or laptop computer, and so forth.

The light guide may be configured to provide a display along an image plane focused at infinity. Thus, the light guide may be viewed by a user with minimal or no contraction of eye muscles, such as may be observed by a user when viewing the horizon or other far away object. In this way, users that traditionally utilized glasses to view a display device (e.g., suffered from presbyopia) may in some instances view the light guide without the glasses.

A variety of functionality may be enabled by leveraging use of the light guide. For example, the light guide may be configured to support transparency such that physical surroundings of the light guide are viewable through the light guide. This may be utilized to support a variety of different scenarios, such as augmented reality in which an augmentation is displayed and the physical environment is viewable through the display. In another example, the light guide may support a field of view that increases as a distance between a user's eyes and the light guide decreases. In this way, a user may bring a device (e.g., a mobile phone) that employs the light guide closer to see more of a user interface output by the device. In addition, since the image plane may appear 'behind' the screen of the actual device, the device may support gestures involving movement of the device itself, such as to pan images by simply tilting the device. Thus, the functionality supported by the increased field of view and the panning of the image may be particularly useful for a mobile device where the size of the display device is limited and content exceeds the available screen real estate. A variety of other examples are also contemplated, such as to employ touch sensors, use of eye tracking hardware, use of a controllable rear layer of the device that is capable of varying the opacity from clear to dark/opaque (e.g., to improve contrast), and so on, further discussion of which may be found in relation to the following figures.

In the following discussion, an example environment is first described that may employ the light guide techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ light guide techniques as described herein. The illustrated environment 100 includes a computing device 102, which may be configured in a variety of ways. For example, the computing device 102 is illustrated as employing a housing 104 that is configured in a handheld form factor to be held by one or more hands 106, 108 of a user as illustrated. The handheld form factor, for instance, may include a tablet computer, a mobile phone, portable game device, and so forth. However, a wide variety of other form factors are also contemplated, such as computer and television form factors as described in relation to FIG. 12.

Accordingly, the computing device 102 may range from full resource devices with substantial memory and processor resources (e.g., personal computers, game consoles) to low-resource devices with limited memory and/or processing resources (e.g., traditional televisions, net books). Additionally, although a single computing device 102 is shown, the computing device 102 may be representative of a plurality of different devices, such as a user-wearable helmet or glasses and game console, a remote control having a display and set-top box combination, and so on.

The computing device 102 is further illustrated as including a display device 110 that is at least partially transparent in this example. The transparency of the display device 110 is illustrated as allowing at least a portion of the physical surroundings 112 of the computing device 102 to be viewed through the device. In the illustrated example, the physical surroundings 112 that are viewable through the display device 110 include trees and part of a finger of the user's hand 106 that is being used to hold the computing device 102. A car 114 is also illustrated as being displayed by the display device 110 such that at least a portion of the user interface and the physical surroundings 112 are viewable using the display device 110. This may be used to support a variety of different functionality, such as augmented reality as further described below.

The computing device 102 also includes an input/output module 116 in this example. The input/output module 116 is representative of functionality relating to detection and processing of inputs and outputs of the computing device 102. For example, the input/output module 116 may be configured to receive inputs from a keyboard, mouse, to recognize gestures and cause operations to be performed that correspond to the gestures, and so on. The inputs may be identified by the input/output module 116 in a variety of different ways.

For example, the input/output module 116 may be configured to recognize an input received via touchscreen functionality of a display device 110, such as a finger of a user's hand 108 as proximal to the display device 110 of the computing device 102, from a stylus, and so on. The input may take a variety of different forms, such as to recognize movement of the finger of the user's hand 108 across the display device 110, such as a tap on the car 114 in the user interface as illustrated by a finger of the user's hand 108, drawing of a line, and so on. The user's hand and/or finger can either be touching the device or hovering above the device and these could be detected as separate gestures. Other examples of input include tracking pupils and blinks of the user's eyes, gestures involving movement of the device itself (e.g., tilting or shaking the device), and so on.

In implementations, these inputs may be recognized as gestures that are configured to initiate one or more operations of the computing device 102 or other device, such as to navigate through a user interface, select and/or move objects displayed in the user interface, and so on. Although the gesture is illustrated as being input through a front of the display device 110, the computing device 102 may also include touch sensors located on the back of the display device 110 to recognize gestures, further discussion of which may be found beginning in relation to FIGS. 4 and 5.

The input/output module 116 is also illustrated as including an augmented reality module 118. The augmented reality module 118 is representative of functionality of the computing device 102 to augment a view of the physical surroundings 112 (e.g., the "real world") of the computing device 102 using the display device 110. In the illustrated example, for instance, the computing device 102 is illustrated as being physically positioned in surroundings that include three trees and fingers of the user's hand 106.

The augmented reality module 118 is configured to output an augmentation (e.g., the car 114) to be viewed in conjunction with the physical surroundings 112. To generate this view and know "where" to place to augmentation, the augmented reality module 118 may leverage a variety of techniques to determine an orientation and/or position of the computing device 102 in relation to the physical surroundings 112 of the device. For example, the augmented reality module 118 may leverage a camera 120 to capture images of the physical surroundings 112. The augmented reality module 118 may then process the images to locate one or more markers to determine how the computing device 102 is positioned, oriented, moved, and so on.

These markers may take a variety of forms. For instance, the augmented reality module 118 may set one or more view points in the physical surroundings 112 as markers and thus serve as a basis to determine orientation and/or positioning, such as where the trunks of the trees meet the ground. In another instance, the augmented reality module 118 may leverage a view of one or more augmented reality (AR) tags that are physically positioned within the surrounding environment of the computing device 102. Thus, the items in the physical surroundings 112 may act as a basis to determine where the computing device 102 is located as well as how the computing device 102 is oriented.

In another example, the camera 120 may be configured to capture one or more images of a user of the computing device 102. For example, a lens of the camera 120 is illustrated in FIG. 1 as a circle disposed to the right of the display device 110 in the housing 104 as pointed toward a face of a user of the computing device 102. Images captured by the camera 120 may then be used to determine a three dimensional location of pupils of the user. In one or more implementations, the location of the pupils is calculated without calculating a vector that describes "where the eye is pointing," thereby conserving resources of the computing device 102. Other examples are also contemplated in which such a vector is calculated. In this way, the augmented reality module 118 may determine how to output the augmentation (e.g., the car 114) for display by the display device 110.

The augmented reality module 118 may also leverage one or more sensors 122 to determine a position and/or orientation of the computing device 102, and more particularly a position and/or orientation of the display device 110. For example, the sensors 122 may be configured as an inertial measurement unit (IMU), which may include a gyroscope, one or more accelerometers, a magnetometer, and so on including any combination thereof. These units may be used to generate a basis with which to determine an orientation and position of the computing device 102 in relation to its physical surroundings 112.

Through one or more of these examples, the augmented reality module 118 may capture a view of the "reality" that is to be augmented. The augmentation may then be computed to be displayed at a size, orientation, and location using the display device 110. The augmentation may be configured in a variety of ways, such as for two-dimensional output, three dimensional output, and so on. For instance, the augmented reality module 118 and the display device 110 may leverage stereoscopic techniques to give a perception of depth to the augmentation, such as through autostereoscopy in which optics are used by the display device 110 to split an image directionally to the user's eyes. A variety of other techniques are also contemplated without departing from the spirit and scope thereof. Further, it should be readily apparent that augmentations generated by the augmented reality module 118 may assume a variety of other forms, such as objects as part of a game and other changes to a view of the physical surroundings 112 of a computing device 102 through display as part of a user interface that is viewable through the display device 110.

The display device 110 may be configured in a variety of ways to support the techniques described herein, such as through configuration as a light guide that provide an output utilizes a focal plane focused at infinity. An example of such a light guide is described beginning in relation to the following figure.

Figure 2:
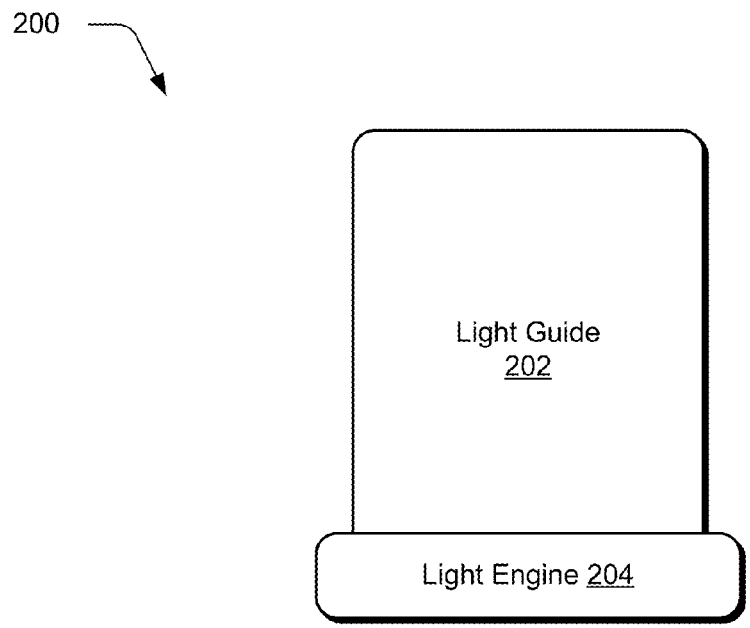
FIG. 2 depicts an example of a display device of FIG. 1 as including a light guide illustrated in a front view.

FIG. 2 depicts an example 200 of the display device 110 of FIG. 1 configured as including a light guide illustrated in a front view. The example 200 includes a light guide 202 and a light engine 204 that form the display device 110. The light guide 202 may be configured in a variety of ways, such as a piece of glass, plastic, or other optically transmittable material that serves to display an output of the light engine 204.

The light engine 204 may be configured in a variety of ways, such as a pico projector or other image output device. Examples of a light engine 204 include laser driven LCOS or LED driven scanning, an LCOS display, e.g., including RGB LEDs, and so on. The light engine 204 is optically coupled to the light guide 202 such that an output of the light engine 204 is displayed by the light guide 202 for viewing by one or more users. The light engine 204 may be optically coupled to the light guide 202 in a variety of ways, an example of which may be found in relation to the following figure.

Figure 3:
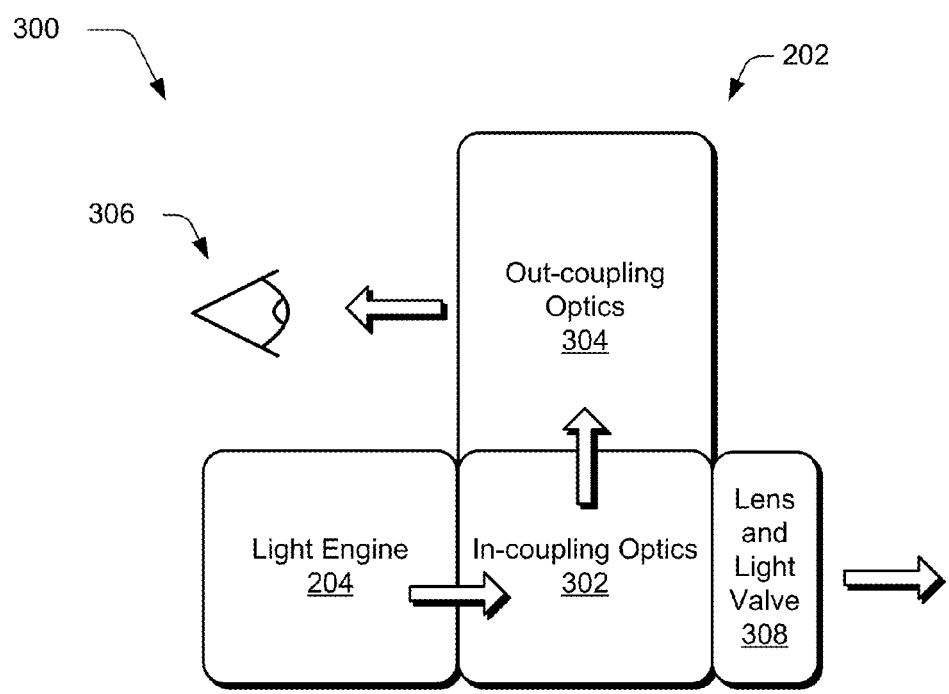
FIG. 3 depicts an example of the light guide of FIG. 2 which is shown in greater detail using a side view.

FIG. 3 depicts an example 300 of the light guide 202 of FIG. 2 which is shown in greater detail using a side view. The light guide 202 in this example is illustrated as including in-coupling optics 302 and out-coupling optics 304. The in-coupling optics 302 are configured to optically couple the light engine 204 to the light guide 202. The in-coupling optics 302 may be configured in a variety of ways, such as surface relief gratings, switchable Bragg gratings, volume holograph gratings, reflective and partially reflective surfaces, free form optical elements, wedge optics, and so forth.

In the illustrated example, the in-coupling optics 302 are configured to bend light output by the light engine 204 approximately ninety degrees for transmission to the out-coupling optics 304. Thus, the in-coupling optics 302 in this example may utilize one or more techniques to "turn light" for transmission to the out-coupling optics as described above.

Further, the in-coupling and out-coupling optics 302, 304 may be utilized as pupil expanders to expand an output from the light engine 204. The in-coupling optics 302, for instance, may be configured to expand an output of the light engine 204 horizontally. The out-coupling optics 304 may then receive this horizontally expanded output and further expand it in a vertical direction for output to the eye 306, e.g., an eye of the user of the computing device 102, such as by again utilizing one or more techniques to "turn light".

Therefore, the light engine 204 may be configured as a laser driven LCOS or LED driven scanning or LCOS display, may include RGB LEDs or lasers having a bandwidth less than the range of five to ten nanometers to allow for efficient diffraction (if one of the diffractive techniques is used to couple light in and/out; in other cases the bandwidth of the LEDs is not so constrained), and so forth. The light engine 204 is optically coupled to the in-coupling optics 302 of the light guide 202 utilizing one or more techniques to "turn light" as previously described. Light is then transmitted along the light guide 202 through the in-coupling optics 302 using total internal reflection (TIR) to a horizontal expansion grating. This grating serves to expand the "exit pupil" horizontally and in addition turns the light ninety degrees so it is propagating upwards in the example 300 as shown by the arrows. The light then encounters the out-coupling optics 304 which expands the "exit pupil" vertically and again turns the light as shown by the arrows so it is coupled out of the light guide 202 and towards an eye 306 of the user to view an image, e.g., a part of a user interface.

In one or more implementations, the in-coupling optics 302 may be switchable to support different display modes. For example, the in-coupling optics 302 may be "switched on" in a first mode (e.g., using a switchable Bragg grating) to cause the output of the light engine to be "turned" and transmitted to the out-coupling optics 304 for display to the eye 306 of the user as described above.

The in-coupling optics 304 may also be "switched off" to support a second mode in which the display device 110 is to act as a projector, such as to project an output of the light engine 204 "out the back" of the housing 104 of the computing device 102 of FIG. 1. In this example, the in-coupling optics 304 are switched off such that the light from the light engine 204 is not bent to couple to the out-coupling optics 304.

Rather, the light from the light engine 204 passes through the in-coupling optics 302 without bending in this example to serve as a projector. The computing device 102, for instance, may include a lens and light valve 308 supported by the housing 104 of FIG. 1 to use the output of the light engine 204 as a projector, e.g., to project the output onto a surface that is external to the computing device 102 such as a tabletop, wall, and so forth. In this way, the display device 110 may be used in a variety of modes to support different display techniques for use by the computing device 102.

Figure 4:
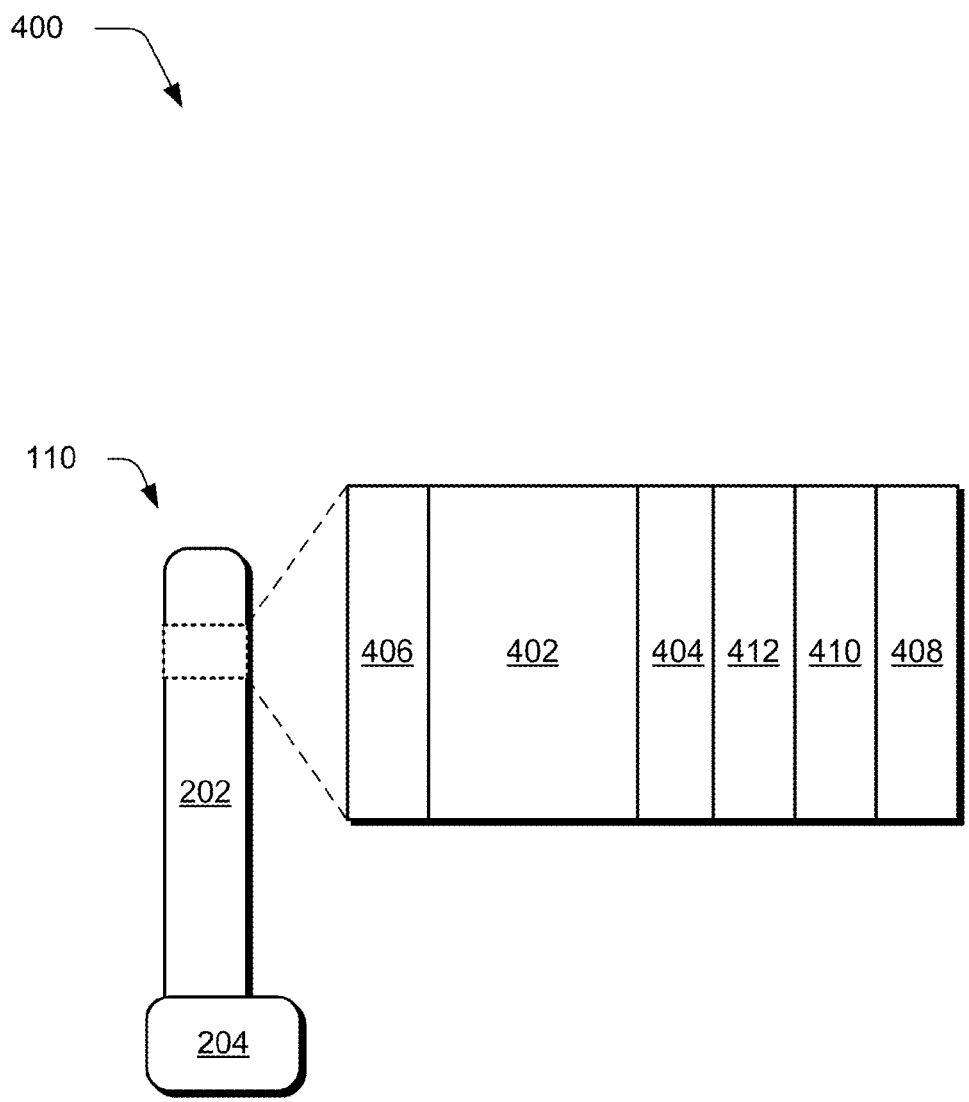
FIG. 4 depicts an example implementation of the light guide and light engine of the display device of FIG. 3 in which layers of the light guide are shown.

FIG. 4 depicts an example implementation of the light guide 202 and light engine 204 of the display device 110 in which layers of the light guide 202 are shown. The light guide 202 includes an optically transparent material 402 and diffraction grading matrix 404 that are usable to implement out-coupling optics 304 as described above in relation to FIG. 3.

The light guide 202 also includes a layer 406 to implement touch sensors across a front surface of the display device 110. The layer 406, for instance, may be configured as a grid formed using indium tin oxide (ITO) to detect X, Y coordinates of a contact, such as one or more fingers of the user's hand 108 as shown in relation to FIG. 1. Thus, this layer 406 may be used to provide inputs to the input-output module 116 which may be used to recognize one or more gestures to initiate one or more operations of the computing device 102, e.g., navigate through a user interface, launch an application, interact with a display object, and so forth.

The light guide 202 may also include a layer 408 disposed on the back of the light guide 202 to implement touch sensors. The light guide 202, for instance, may be configured to support viewing at a distance from the user's eye such that it is inconvenient for a user to interact with a front surface of the light guide, e.g., the layer 406 that supports the touch sensors on the front of the display device 110. Accordingly, the layer 408 disposed on the rear of the device may also be configured to recognize gestures, further discussion of which may be found beginning in relation to FIG. 5.

The light guide 202 is also illustrated as including an electro-chromic layer 410 that is separated from the diffraction grading matrix 404 by an air gap 412 or lower optical index material. The electro-chromic layer 410 is operable to alternate between transparent and non-transparent states. This may be used for a variety of purposes, such as to control which part of a physical surroundings 112 of the computing device 102 are viewable through the display device 110, improve contrast for portions of a user interface displayed by the display device 110, and so on, further discussion of which may be found in relation to the following figure.

Figure 5:
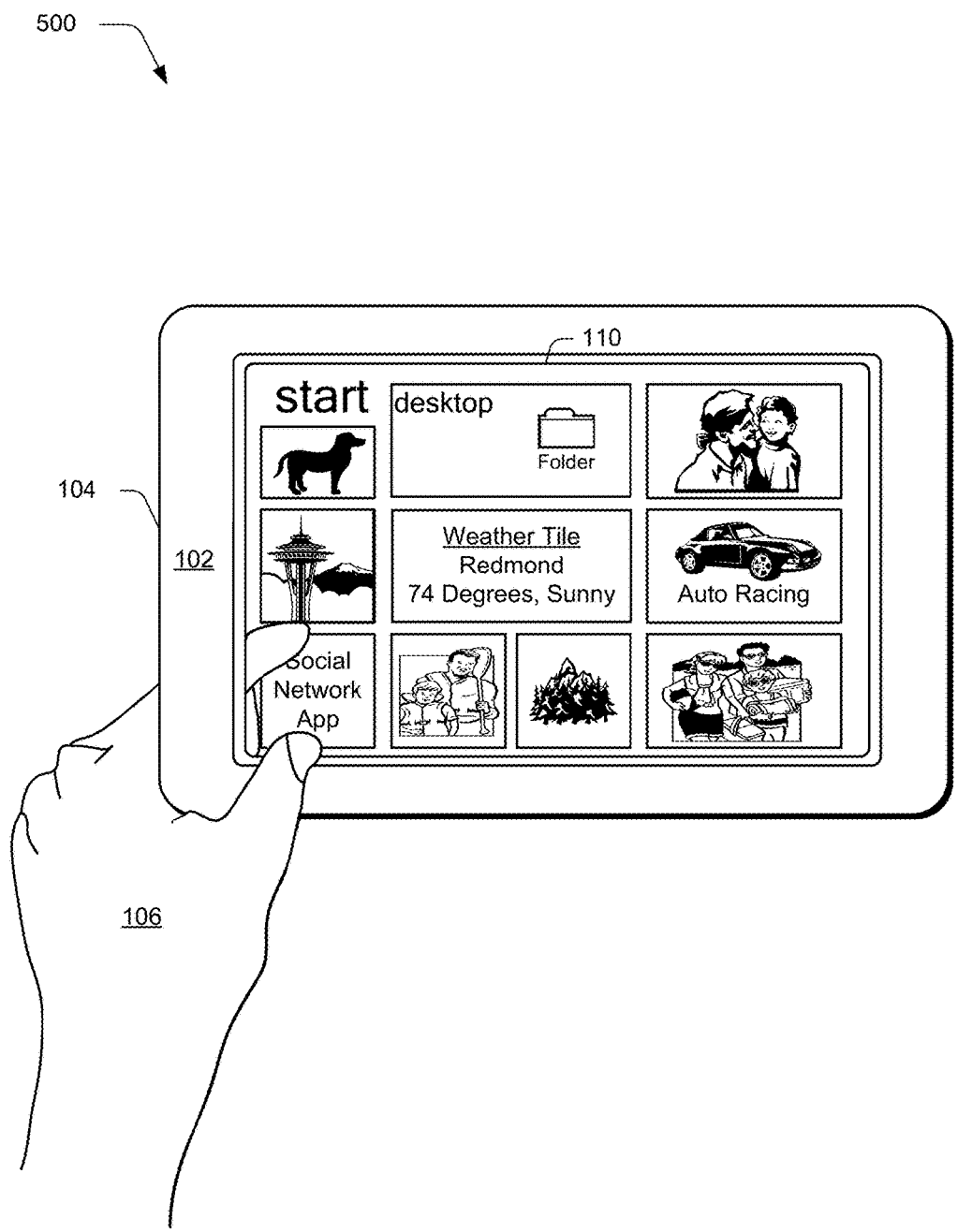
FIG. 5 depicts an example implementation showing the computing device of FIG. 1 as outputting a user interface and supporting gestures detected via a back side of the display device.

FIG. 5 depicts an example implementation 500 showing the computing device 102 of FIG. 1 as outputting a user interface and supporting gestures detected via a back side of the display device. In this example, the display device 110 outputs a user interface configured as a start screen for the computing device 102. The start screen includes a plurality of tiles that are selectable to launch respective applications, and may also be configured to output notifications regarding the applications. An example of notifications is illustrated using the weather tile that includes a notification regarding temperature and current weather conditions in Redmond.

As described in FIG. 4, the display device 110 may be configured to detect inputs (e.g., gestures) using the front of the device that is oriented towards a user as well as a rear of the device that is oriented away from the user, e.g., is positioned on an opposing side from the front of the device. A user, for instance, may make a gesture using one or more fingers of the user's hand 106. A variety of different gestures may be made, such as to select a tile displayed by the display device, navigate through a user interface using a pan gesture, a zoom gesture, and so on. In this way, portions of the user's hand 106 that are positioned at the back of the computing device 102 may still be used to provide inputs.

Further, as also described in relation to FIG. 4, the display device 110 may be configured to be optically transparent, yet also include a layer (e.g., the electro-chromic layer 410) to control which portions of the display device 110 are made transparent. This may be used, for instance, to improve contrast of portions of the display device that are used to display the user interface. An example of this may include the portions that are used to display the tiles and text (e.g., "start") in the illustrated example, which may be used to support the color black in the user interface.

These techniques may also be configured to support selectable opacity, such as to control an amount of the physical surroundings that are viewable through the display device 110. This may be used to provide a variety of functionality. For example, portions of the display device 110 may be made partially transparent to allow a portion of a user's hand 106 to be viewed through the display device. In this way, a user may readily view "where" the user's finger is positioned, which may aide user interaction including use of gestures that are detected via touchscreen functionality disposed on the rear of the display device 110.

Additionally, this technique may be combined with how the user interface itself is displayed as illustrated. In the example implementation 500, portions of the finger of the user's hand 106 that are disposed proximal to the back of the display device 110 are made transparent such that a user may view the finger of the user's hand. This includes portions of the user interface such that the finger of the user's hand 106 appears to be displayed in conjunction with the tile, such that the user may readily determine which tile is currently selectable at the current position of the finger. Portions of the tile in the user interface that do not coincide with the contact are not made transparent (e.g., through display of the user interface and/or use of the electro-chromic layer 410) in this example. In this way, interaction with the back of the display device 110 may be aided. A variety of other examples are also contemplated, such as display in the user interface of indicia that correspond to points that are contacted by the finger of the user's hand 106 on the back of the display device 110. It is also noted that this per-region opacity control may significantly enhance the appearance of augmentations that are displayed by the display device while allowing transparency between the augmentations so the physical surroundings (e.g., the "real world") can be viewed clearly concurrently with the augmentations. Note also that the entire display can be made opaque which may be used to aid in experiences that do not involve a view of the real world, e.g., such as to watch a movie.

Figure 6:
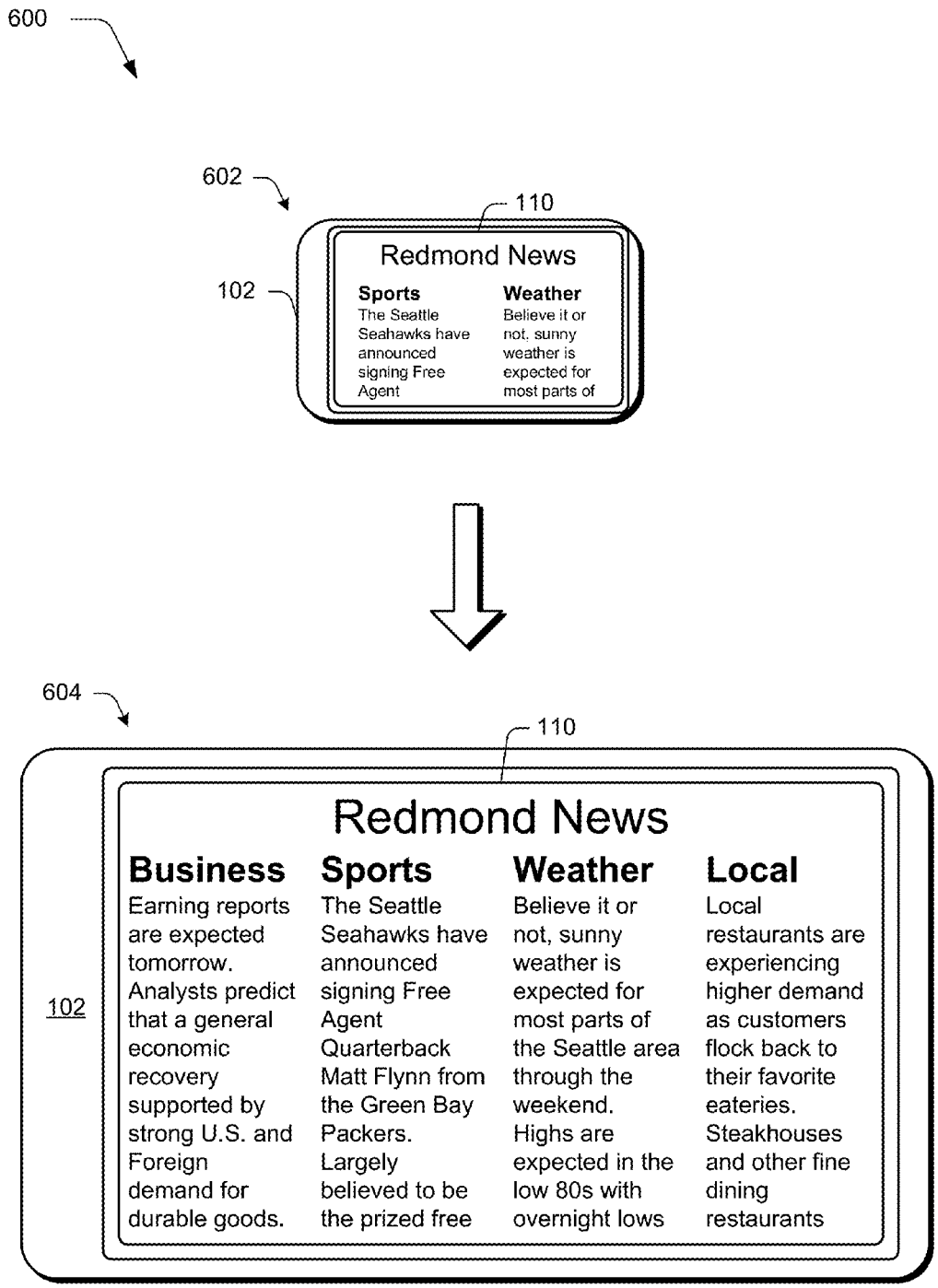
FIG. 6 depicts an example implementation of the display device of the computing device of FIG. 1 that shows differences in field of view based on corresponding differences in distance between the display device and a user.

FIG. 6 depicts an example implementation 600 of the display device 110 of the computing device 102 that shows differences in field of view based on corresponding differences in distance between the display device 110 and a user. The example implementation 600 is illustrated using first and second stages 602, 604. At the first stage 602, the computing device 102 is illustrated as being positioned at a first distance away from the user, such as when being held at arm's length, e.g., approximately thirty inches.

As previously described, the computing device 102 may include a display device 110 that incorporates the light guide 202 of FIG. 2. The light guide 202 may be configured to provide an output through the out-coupling optics 304 of FIG. 3 along an image plane focused at infinity for viewing by a user. The out-coupling optics 304, for instance, may provide an output of parallel light that a user may view similar to looking at a faraway object, such as the horizon. Because of this, the display device 110 may be viewed from a wide range of distances, including distances that are even less than an inch from the user's eye 306 up to a point at which the display device 110 itself is not viewable.

Use of the light guide as part of the computing device 102 may also support techniques relating to field of view. At the first stage, for instance, a user interface is illustrated as being display by the display device 110. The user interface in this example includes a headline "Redmond News" along with two columns, which are illustrated as "Sports" and "Weather." As previously described, the first stage 602 shows the computing device 102, and therefore the display device 110 of the computing device 102, as positioned at approximately an arm's length from the eyes of the user holding the device.

The user in this example may then desire to view more of the user interface, such as to view a larger amount content included in the user interface. In this example, through configuration of the display device 110 to include the light guide, the user may simply physically move the computing device 102 closer as shown in the second stage 604. By moving the display device 110 closer, the field of view viewable by the user from the display device 110 increases.

This is illustrated in the second stage 604 through viewing through the display device of the same user interface displayed in the first stage 602. However, additional columns of the user interface are viewable as positioned in the second stage 604, such as the "Business" and "Local" columns as well as additional content in the columns. Thus, the field of view increases as the display device 110 is moved closer to the user's eye.

Further this increase is passive in that the size or resolution is not changed by the computing device 102 itself, e.g., due to inputs received from a user to increase the size or resolution, use of one or more sensors, and so on. In this way, objects displayed by the display device 110 remain in focus regardless of how close the user's eye is positioned to the display. This may therefore be used by a user to adjust an amount that is viewed on the screen, such as to read a newspaper, browse the web or consume short video content by changing a distance between the user and the display. For example, using a 3.5" screen as an example, if the display device 110 produces a 45 degree field of view, holding the display device 110 one inch from the eye would yield an image equivalent to a 105" diagonal display device at an arm's length of 30". Further discussion of the field of view techniques may be found in relation to the following figure.

Figure 7:
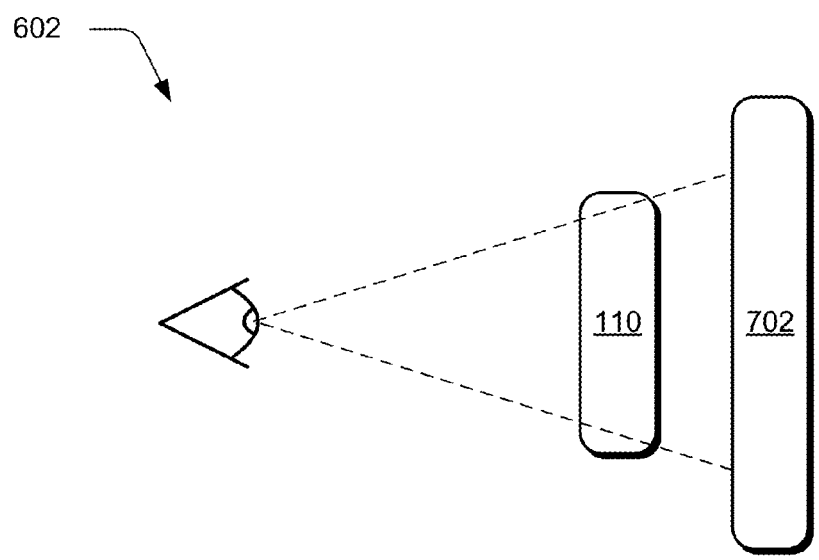
FIGS. 7 and 8 illustrate example side views of first and second stages shown in FIG. 6, respectively.
Figure 8:
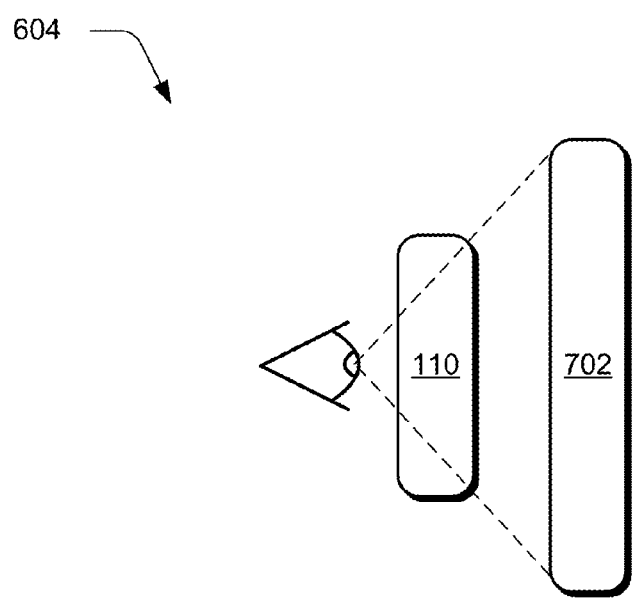

FIGS. 7 and 8 illustrate example side views of the first and second stages 602, 604 shown in FIG. 6, respectively. At the first stage 602, the user's field of view is illustrated using dashed lines to show a portion of a user interface 702 that is viewable through the display device 110. At the second stage shown in FIG. 8, the user's eye is positioned closer to the display device 110, which enables the user to view a larger portion of the user interface 702 as shown by the dashed lines. Thus, the display device 110 may support these different fields of view by outputting the user interface at an image plane that is focused at infinity, e.g., through output of parallel light by the light guide 202 of FIG. 2.

This functionality may be likened to viewing a billboard through a hole in a fence. As the user moves closer to the hole in the fence, not only is the type size of the billboard increased (e.g., a user is able to view smaller text as shown in FIG. 6), but the amount of the billboard that is viewable also increases. Thus, the display device 110 may passively enable a user to alter a field of view viewable to the user based on a range of distances between the user's eye and the display device 110. For instance, the range may be defined based on n ability of a user to view an entirety of the display device 110.

The field of view, for instance, may increase as a user nears the display device 110 until a user is so close that outer portions of the display device are no longer viewable in the periphery of the user's vision. Although altering the field of view based on distance was described in relation to a mobile device such that a user could move the device itself, these techniques may also be employed in situations in which the user moves and the device is configured to remain at a constant position, an example of which may be found in relation to the following figure.

Another scenario may be supported by these techniques to expand user interaction. For example, a user may view the computing device 102 at arm's length, similar to viewing the billboard in the previous example. However, instead of bringing the device closer to the user's eyes, the user may move the device (e.g., tilt the device at different angles relative to a plane that is perpendicular to axis between the display device and a user's eye) to view different areas of the billboard that would not be visible in the original position. This would, for example, allow a user to sit comfortably and read different portions of a newspaper at arm's length by tilting the device. It is useful to contrast the new device experience with currently available technology. When trying to read a newspaper on a handheld device such as one of today's cellphones, a user would be forced to continually scroll using touch or other gestures to navigate through the content. With the techniques described herein, however, tilting the device to see different portions of the user interface may be supported passively by the display device like the field of view example above.

Figure 9:
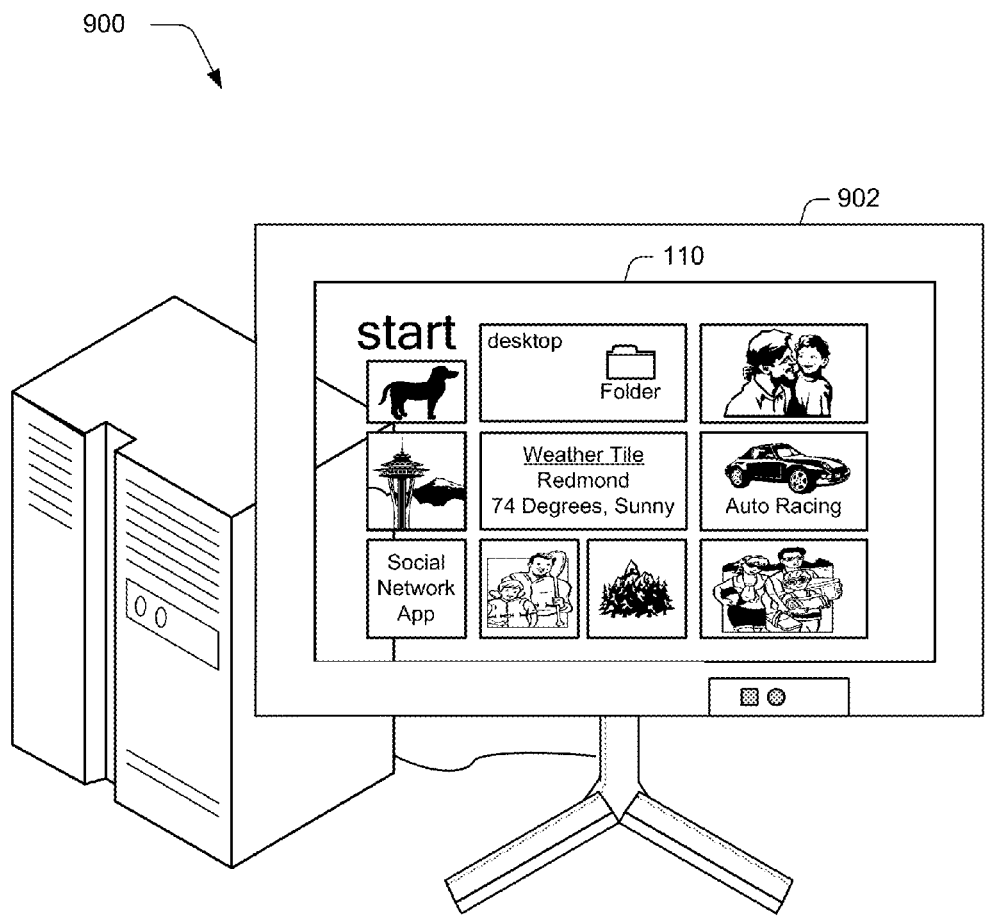
FIG. 9 depicts an example implementation showing a display device of FIG. 1 as being configured to rest on a surface horizontally.

FIG. 9 depicts an example implementation 900 showing the display device 110 of FIG. 1 as being configured to rest on a surface horizontally. The display device 110 in this example is illustrated as incorporated within a housing 902 that is configured to rest on a surface, such as a desktop, table top, and so forth for use in a computer configuration as further described in relation to FIG. 12. The display device 110 incorporates a light guide 202 and light engine 204 of FIG. 2 and as such, may display a user interface using the light guide along an image plane focused at infinity.

In the illustrated example, the display device 110 is illustrated as supporting transparency and configured within the housing 902 such that the physical surroundings are viewable through the display device 110, such as a portion of a desktop computing device as illustrated. Other implementations are also contemplated, such as implementations in which the physical surroundings are not viewable through the display device 110, are viewable in a controllable manner as described in relation to FIG. 4, and so on. Other implementations of the display device 110 within the housing are also contemplated, such as a television implementation in which the housing is configured to be mounted to a vertical surface, an example of which is further described in relation to FIG. 12.

Example Procedures

The following discussion describes light guide techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment and example systems of FIGS. 1-9.

Figure 10:
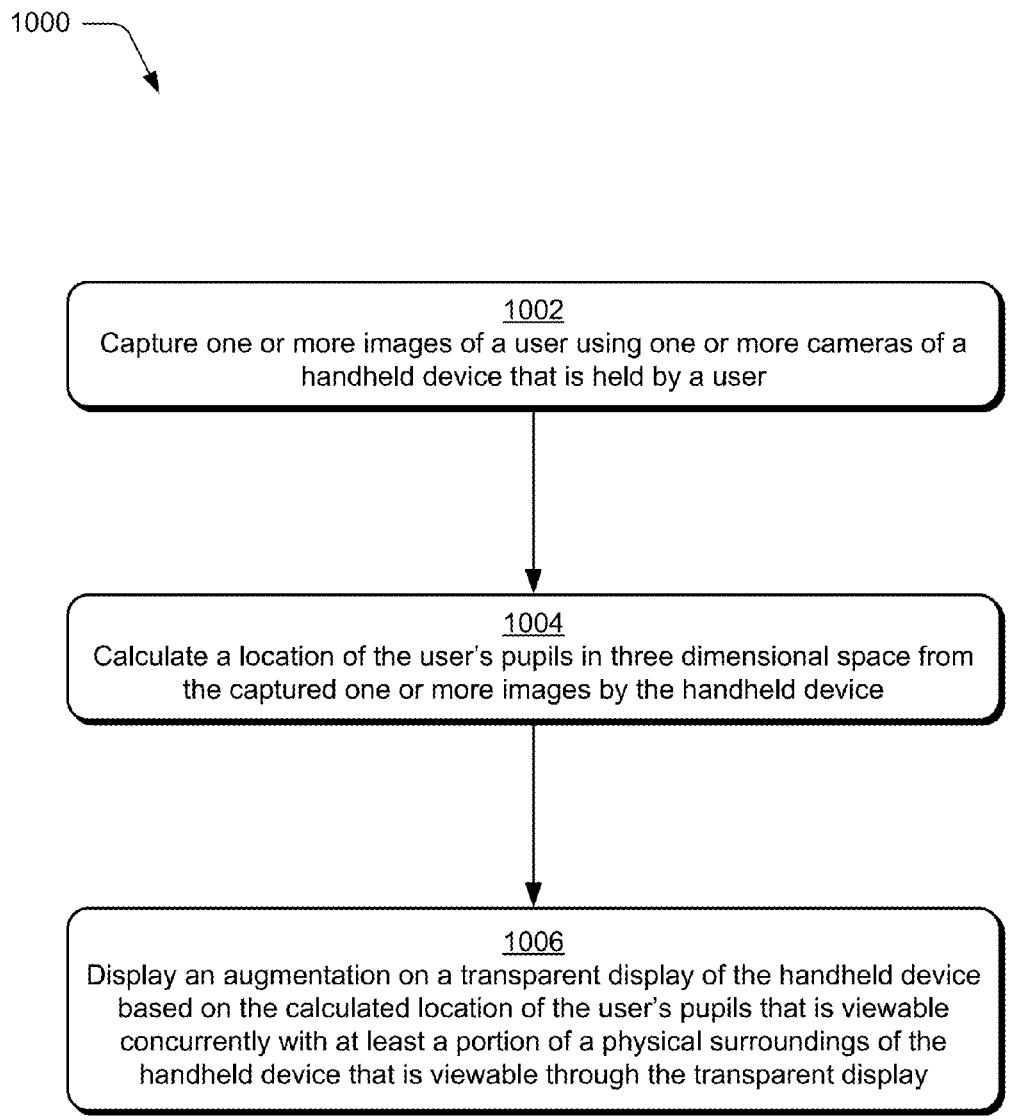
FIG. 10 is a flow diagram depicting a procedure in an example implementation in which captured images are used to locate a user's pupils for display of an augmentation.

FIG. 10 depicts a procedure 1000 in an example implementation in which captured images are used to locate a user's pupils for display of an augmentation. One or more images of a user are captured using one or more cameras of a handheld device that is held by a user (block 1002). A user, for instance, may have images captured by a forward-facing camera of a mobile communications device, e.g., a mobile phone, tablet computer, and so on.

A location of a user's pupils is calculated in three dimensional space from the captured one or more images by the handheld device (block 1004). The augmented reality module 118, for instance, may examine the images to determine the location.

An augmentation is displayed on a transparent display of the handheld device based on the calculated location of the user's pupils that is viewable concurrently with at least a portion of a physical surroundings of the handheld device that is viewable through the transparent display (block 1006). As shown in FIG. 1, for instance, the augmentation may be configured as a car 114 that is viewable concurrently with a portion of the physical surroundings 112 that are viewable through the display device 110, which in this instance are trees and part of a finger of a user's hand 106. Other examples are also contemplated, e.g., the camera may rest on a surface that is not held by a user, such as part of a computer monitor, part of a stand-alone camera that is communicatively coupled to a game console, and so forth.

Figure 11:
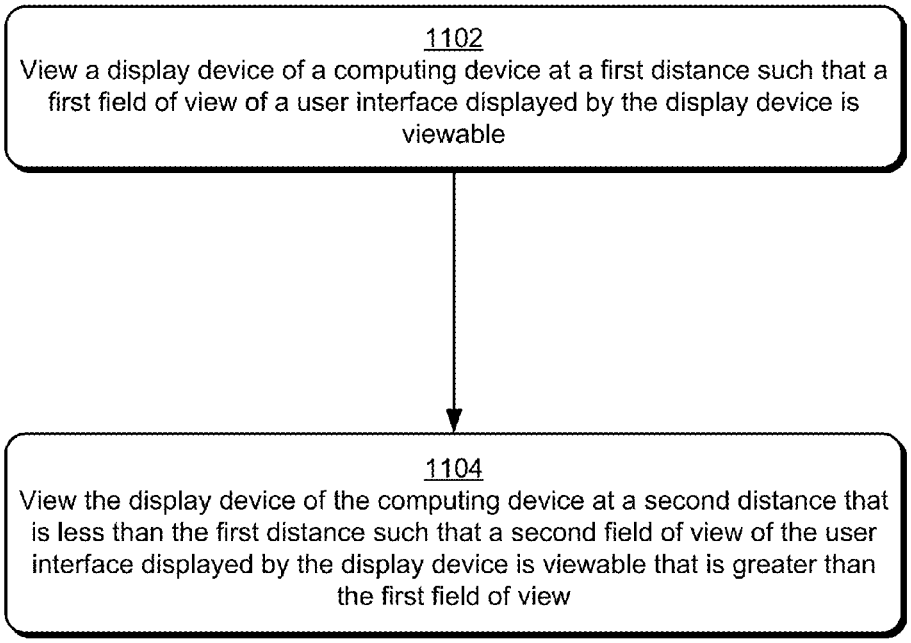
FIG. 11 is a flow diagram depicting a procedure in an example implementation in which a display device is viewed at different distances such that a field of view is expanded the closer the distance between the user and the device.

FIG. 11 depicts a procedure 1100 in an example implementation in which a display device is viewed at different distances such that a field of view is expanded the closer the distance between the user and the device. A display device of a computing device is viewed at a first distance such that a first field of view of a user interface displayed by the display device is viewable (block 1102). The computing device 102, for instance, may be supported by a surface, e.g., mounted to a wall like a television, rested on a desk to tabletop such as a computer monitor. In another example, the computing device 102 may assume a handheld configuration and be held at approximately arm's length. An example of this is illustrated in the first stage 602 of FIGS. 6 and 7.

The display device of the computing device is viewed at a second distance that is less than the first distance such that a second field of view of the user interface displayed by the display device is viewable that is greater than the first field of view (block 1104). A user, for instance, may bring the computing device 102 that is being held closer to the user's eyes. In another instance, a user may move toward the computing device 102 to lessen the distance. Because the user interface is displayed at an image plane focused at infinity, the field of view may increase as shown in the second stage 604 of FIGS. 6 and 8.

Example System and Device

Figure 12:
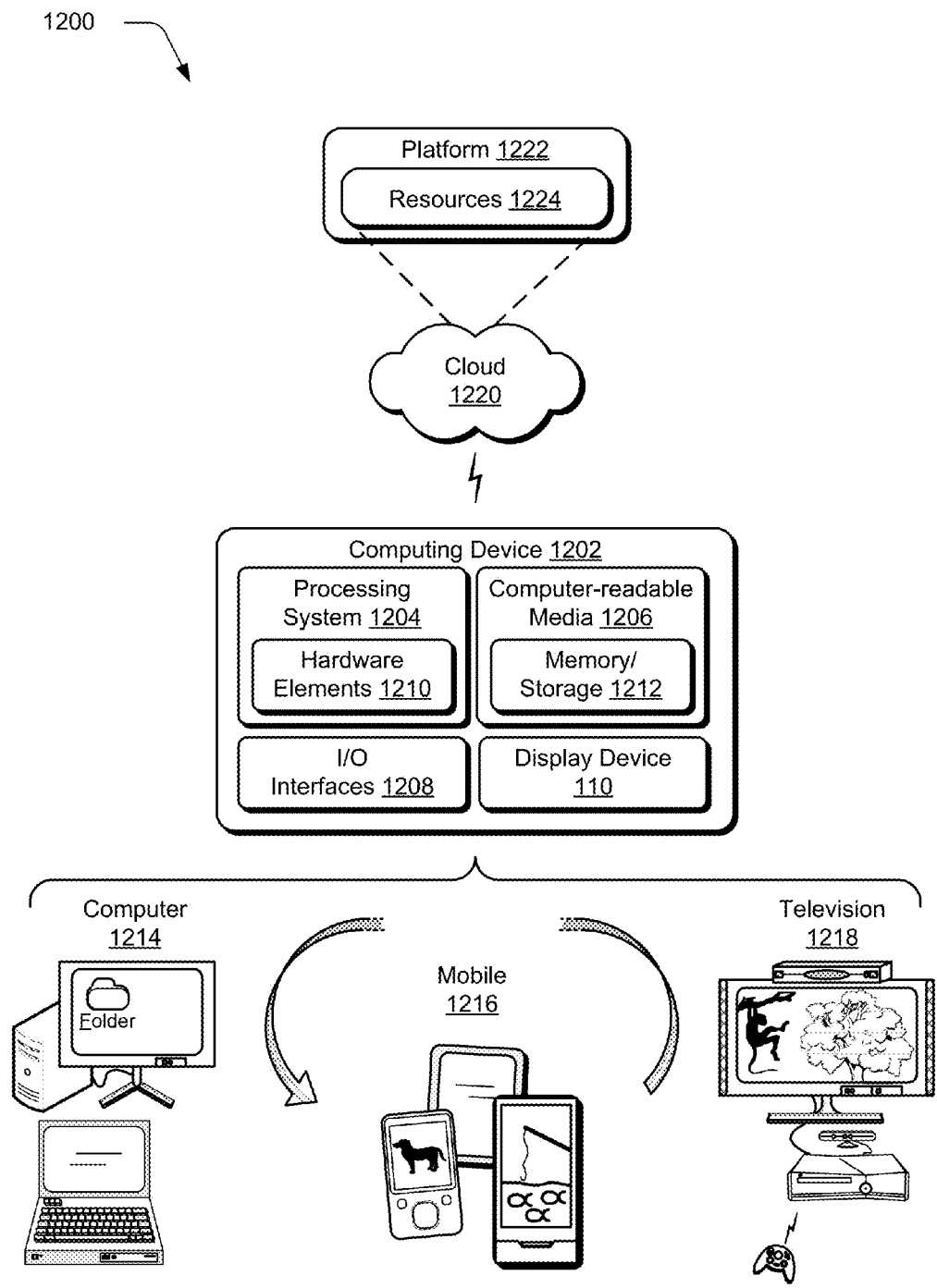
FIG. 12 illustrates an example system including various components of an example device that can be implemented as any type of computing device as described with reference to FIGS. 1-11 to implement embodiments of the techniques described herein.

FIG. 12 illustrates an example system generally at 1200 that includes an example computing device 1202 that is representative of one or more computing systems and/or devices that may implement the various techniques described herein. The computing device 1202 may be, for example, a server of a service provider, a device associated with a client (e.g., a client device), an on-chip system, and/or any other suitable computing device or computing system. Further, the computing device 1202 includes a display device 110 as previously described, which may incorporate a light guide 202 and light engine 204 as further detailed in relation to FIG. 2.

The example computing device 1202 as illustrated includes a processing system 1204, one or more computer-readable media 1206, and one or more I/O interface 1208 that are communicatively coupled, one to another. Although not shown, the computing device 1202 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware element 1210 that may be configured as processors, functional blocks, and so forth. This may include implementation in hardware as an application specific integrated circuit or other logic device formed using one or more semiconductors. The hardware elements 1210 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1206 is illustrated as including memory/storage 1212. The memory/storage 1212 represents memory/storage capacity associated with one or more computer-readable media. The memory/storage component 1212 may include volatile media (such as random access memory (RAM)) and/or nonvolatile media (such as read only memory (ROM), Flash memory, optical disks, magnetic disks, and so forth). The memory/storage component 1212 may include fixed media (e.g., RAM, ROM, a fixed hard drive, and so on) as well as removable media (e.g., Flash memory, a removable hard drive, an optical disc, and so forth). The computer-readable media 1206 may be configured in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1202 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1202. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1202, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1210. The computing device 1202 may be configured to implement particular instructions and/or functions corresponding to the software and/or hardware modules. Accordingly, implementation of a module that is executable by the computing device 1202 as software may be achieved at least partially in hardware, e.g., through use of computer-readable storage media and/or hardware elements 1210 of the processing system 1204. The instructions and/or functions may be executable/operable by one or more articles of manufacture (for example, one or more computing devices 1202 and/or processing systems 1204) to implement techniques, modules, and examples described herein.

As further illustrated in FIG. 12, the example system 1200 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1200, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 1202 may assume a variety of different configurations, such as for computer 1214, mobile 1216, and television 1218 uses. Each of these configurations includes devices that may have generally different constructs and capabilities, and thus the computing device 1202 may be configured according to one or more of the different device classes and accordingly the display device 110 may also be configured to accommodate these different configurations. For instance, the computing device 1202 may be implemented as the computer 1214 class of a device that includes a personal computer, desktop computer, a multi-screen computer, laptop computer, netbook, and so on.

The computing device 1202 may also be implemented as the mobile 1216 class of device that includes mobile devices, such as a mobile phone, portable music player, portable gaming device, a tablet computer, a multi-screen computer, and so on. The computing device 1202 may also be implemented as the television 1218 class of device that includes devices having or connected to generally larger screens in casual viewing environments. These devices include televisions, set-top boxes, gaming consoles, and so on.

The techniques described herein may be supported by these various configurations of the computing device 1202 and are not limited to the specific examples of the techniques described herein. This functionality may also be implemented all or in part through use of a distributed system, such as over a "cloud" 1220 via a platform 1222 as described below.

The cloud 1220 includes and/or is representative of a platform 1222 for resources 1224. The platform 1222 abstracts underlying functionality of hardware (e.g., servers) and software resources of the cloud 1220. The resources 1224 may include applications and/or data that can be utilized while computer processing is executed on servers that are remote from the computing device 1202. Resources 1224 can also include services provided over the Internet and/or through a subscriber network, such as a cellular or Wi-Fi network.

The platform 1222 may abstract resources and functions to connect the computing device 1202 with other computing devices. The platform 1222 may also serve to abstract scaling of resources to provide a corresponding level of scale to encountered demand for the resources 1224 that are implemented via the platform 1222. Accordingly, in an interconnected device embodiment, implementation of functionality described herein may be distributed throughout the system 1200. For example, the functionality may be implemented in part on the computing device 1202 as well as via the platform 1222 that abstracts the functionality of the cloud 1220.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. An apparatus comprising:
a housing;
a light guide supported by the housing; and
a light engine disposed within the housing and optically coupled to the light guide to output a user interface including an augmentation that is viewable concurrently with at least a portion of the physical environment through the light guide;
wherein the light engine causes the light guide to project the user interface along an image plane focused at infinity, wherein a field of view of the user interface increases in reverse proportion to a distance between a user and the light guide, wherein a first amount of content of the user interface is in the field of view at a first distance between the user and the light guide, and a second amount of content of the user interface that is greater than the first amount of content is in the field of view at a second distance between the user and the light guide, wherein the first distance is greater than the second distance.

2. The apparatus of claim 1, wherein the at least part of the physical surroundings and at least part of the user interface are viewable concurrently using the light guide.

3. The apparatus of claim 1, wherein the light guide includes front and rear surfaces that oppose each other, each having touch sensors that are configured for use in detecting inputs to interact with the apparatus.

4. The apparatus of claim 1, wherein the light guide is configured to display the user interface at least partially in three dimensions.

5. The apparatus of claim 1, further comprising a processing device configured to cause the light engine to output the user interface and to control opacity of portions of the user interface based at least in part on predetermined user settings, and to execute applications and provide telephone functionality.

6. The apparatus of claim 5, wherein the housing is configured as a tablet or mobile phone.

7. The apparatus of claim 1, wherein the user interface is viewable by a user when the distance between the user and the light guide is approximately one inch from an eye of the user and when the distance between the user and the light guide is approximately an arm's length from the user.

8. An apparatus comprising:
a housing;
a light guide, supported by the housing, having a first side configured to be viewed by a user and a second side opposing the first side that includes one or more touch sensors;
a light engine disposed within the housing and optically coupled to the light guide to output a user interface including an augmentation that is viewable concurrently with at least a portion of the physical environment through the light guide, wherein the light engine causes the light guide to project the user interface along an image plane focused at infinity, wherein a field of view of the user interface increases in reverse proportion to a distance between a user and the light guide, wherein a first amount of content of the user interface is in the field of view at a first distance between the user and the light guide, and a second amount of content of the user interface that is greater than the first amount of content is in the field of view at a second distance between the user and the light guide, wherein the first distance is greater than the second distance; and
a processing device disposed within the housing to cause the light engine to output the user interface and to control opacity of portions of the user interface.

9. The apparatus of claim 8, wherein the light guide comprises at least one touch sensor configured to recognize one or more gestures from one or more inputs detected from the one or more touch sensors.

10. The apparatus of claim 8, wherein the light guide further comprises at least one touch sensor included on the first side.

11. The apparatus of claim 8, wherein the at least part of the physical surroundings and at least part of the user interface are viewable concurrently using the light guide.

12. The apparatus of claim 8, wherein the processing device is further configured to execute applications and provide telephone functionality.

13. The apparatus of claim 12, wherein the housing is configured as a tablet or mobile phone.

14. The apparatus of claim 8, wherein the processing device is further configured to cause the light engine to output the user interface for display using the light guide along an image plane focused at infinity.

15. An apparatus comprising:
a housing;
a light guide supported by the housing having a first side that is viewable by a user, a second side opposing the first side, and switchable in-coupling optics; and
a light engine disposed within the housing and optically coupled to the in-coupling optics of the light guide to output a user interface including an augmentation that is viewable concurrently with at least a portion of the physical environment through the light guide, wherein the light engine causes the light guide to project the user interface along an image plane focused at infinity, wherein a field of view of the user interface increases in reverse proportion to a distance between a user and the light guide, wherein a first amount of content of the user interface is in the field of view at a first distance between the user and the light guide, and a second amount of content of the user interface that is greater than the first amount of content is in the field of view at a second distance between the user and the light guide, wherein the first distance is greater than the second distance.

16. The apparatus of claim 15, wherein the second side of the light guide is disposed proximal to at least one lens to transmit an output of the light engine in out a back of the housing that is positioned opposite the first side of the light guide.

17. The apparatus of claim 15, wherein the switchable in-coupling optics are implemented at least partially using a switchable Bragg grating.

18. The apparatus of claim 1, further comprising a processing device disposed within the housing to cause the light guide to selectably control opacity of at least portions of the user interface such that an amount of the physical surroundings are viewable.

19. The apparatus of claim 5, wherein the processing device is further configured to cause the light guide to selectably control opacity of at least portions of the user interface.

20. The apparatus of claim 18, wherein the processing device is further configured to cause the light guide to selectably control opacity of at least portions of the user interface.

* * * * *